US011973999B2

(12) United States Patent
Marten

(10) Patent No.: US 11,973,999 B2
(45) Date of Patent: Apr. 30, 2024

(54) USER CHOSEN WATCH PARTIES

(71) Applicant: DISH Network L.L.C., Englewood, CO (US)

(72) Inventor: Neil Marten, Lakewood, CO (US)

(73) Assignee: DISH Network L.L.C., Englewood, CO (US)

( * ) Notice: Subject to any disclaimer, the term of this patent is extended or adjusted under 35 U.S.C. 154(b) by 128 days.

(21) Appl. No.: 17/891,939

(22) Filed: Aug. 19, 2022

(65) Prior Publication Data

US 2024/0064355 A1 Feb. 22, 2024

(51) Int. Cl.
*H04N 21/262* (2011.01)
*H04N 21/239* (2011.01)
*H04N 21/442* (2011.01)
*H04N 21/472* (2011.01)
*H04N 21/845* (2011.01)

(52) U.S. Cl.
CPC ....... *H04N 21/262* (2013.01); *H04N 21/2393* (2013.01); *H04N 21/44218* (2013.01); *H04N 21/472* (2013.01); *H04N 21/8456* (2013.01)

(58) Field of Classification Search
None
See application file for complete search history.

(56) References Cited

U.S. PATENT DOCUMENTS

| | | | |
|---|---|---|---|
| 6,081,830 A | 6/2000 | Schindler | |
| 6,237,025 B1 | 5/2001 | Ludwig et al. | |
| 6,256,663 B1 | 7/2001 | Davis | |
| 6,392,664 B1 | 5/2002 | White et al. | |
| 6,519,771 B1 | 2/2003 | Zenith | |

(Continued)

FOREIGN PATENT DOCUMENTS

| | | | |
|---|---|---|---|
| CN | 103290360 B | 3/2016 | |
| CN | 110430457 A | 11/2019 | |

(Continued)

OTHER PUBLICATIONS

U.S. Appl. No. 15/788,058, Ntc Appeal with Pre-Appeal Brief Conference Request, Sep. 7, 2022.

(Continued)

*Primary Examiner* — An Son P Huynh
(74) *Attorney, Agent, or Firm* — Wash Park IP Ltd.; John T Kennedy

(57) ABSTRACT

Devices, systems and process for facilitating a user choice watch party (DFWP) are disclosed. A system includes server that includes computer instructions which instruct the server to initiate a user choice watch party (UCWP), receive a request to designate a first user device, from a set of user devices, as a primary user choice user device (PUCUD), query the set of user devices for devices to participate in the UCWP as secondary user choice user devices (SUCUD), generating a user choice interface (UCI), retrieving two or more user choice primary content (UCPC) options, instructing the PUCUD and the SUCUDs to output to respective users the UCPC options, receiving at least two user choices, determining, based on the user choices and from the two more UCPC options, a selection result indicating a chosen UCPC option to present during the UCWP, and presenting the chosen UCPC during the UCWP.

20 Claims, 6 Drawing Sheets

(56) References Cited

U.S. PATENT DOCUMENTS

| | | | |
|---|---|---|---|
| 6,643,291 | B1 | 11/2003 | Yoshihara et al. |
| 6,646,673 | B2 | 11/2003 | Caviedes et al. |
| 6,754,904 | B1 | 6/2004 | Cooper et al. |
| 7,143,428 | B1* | 11/2006 | Bruck .............. H04N 21/6175 709/204 |
| 8,015,306 | B2 | 9/2011 | Bowman |
| 8,046,411 | B2 | 10/2011 | Hayashi et al. |
| 8,223,185 | B2 | 7/2012 | Gratton et al. |
| 8,316,400 | B1 | 11/2012 | Kravets |
| 9,015,306 | B2 | 4/2015 | Dupre et al. |
| 9,226,011 | B2 | 12/2015 | Francisco |
| 9,252,950 | B2 | 2/2016 | Caspi |
| 9,378,474 | B1 | 6/2016 | Story, Jr. et al. |
| 9,471,809 | B2 | 10/2016 | Garrett et al. |
| 9,544,624 | B2 | 1/2017 | VanDuyn et al. |
| 9,654,817 | B2 | 5/2017 | Li et al. |
| 10,135,887 | B1 | 11/2018 | Esser et al. |
| 10,187,690 | B1* | 1/2019 | Garcia ............. H04N 21/44226 |
| 10,237,587 | B2* | 3/2019 | Rea Zanabria .... H04N 21/6405 |
| 10,536,741 | B1 | 1/2020 | Madison et al. |
| 10,575,042 | B2* | 2/2020 | Rennison .......... H04N 21/4126 |
| 10,735,825 | B1 | 8/2020 | Comito et al. |
| 10,757,366 | B1* | 8/2020 | Kwatra ................ H04N 7/147 |
| 10,757,467 | B1 | 8/2020 | Katz et al. |
| 10,762,474 | B2 | 9/2020 | Frank et al. |
| 10,819,758 | B1 | 10/2020 | Krutsch et al. |
| 10,939,148 | B2 | 3/2021 | Sun |
| 11,019,113 | B2* | 5/2021 | Kurata ............... G06Q 10/1095 |
| 11,051,059 | B2 | 6/2021 | Dodson et al. |
| 11,082,467 | B1* | 8/2021 | Hartnett ............. H04N 21/437 |
| 11,128,916 | B2 | 9/2021 | Mayhew et al. |
| 11,166,065 | B1 | 11/2021 | Camargo et al. |
| 11,303,947 | B2 | 4/2022 | Bertolami et al. |
| 11,477,516 | B2* | 10/2022 | Yoden ............... H04N 21/4331 |
| 11,502,864 | B2* | 11/2022 | Moorefield, Jr. ... H04L 12/1822 |
| 11,509,726 | B2* | 11/2022 | Alsina ............. H04N 21/43615 |
| 11,553,159 | B1 | 1/2023 | Rothschild et al. |
| 11,588,869 | B2* | 2/2023 | Gratton .................. H04L 65/80 |
| 11,606,597 | B2 | 3/2023 | Iyer et al. |
| 11,762,917 | B2 | 9/2023 | Frank et al. |
| 2002/0067909 | A1* | 6/2002 | Iivonen ............. H04N 21/4782 348/E7.063 |
| 2003/0009766 | A1 | 1/2003 | Marolda |
| 2003/0097655 | A1 | 5/2003 | Novak |
| 2003/0229900 | A1 | 12/2003 | Reisman |
| 2004/0154040 | A1 | 8/2004 | Ellis |
| 2004/0205811 | A1 | 10/2004 | Grandy et al. |
| 2005/0204387 | A1 | 9/2005 | Knudson et al. |
| 2005/0262542 | A1 | 11/2005 | DeWeese et al. |
| 2006/0010102 | A1 | 1/2006 | Labossiere et al. |
| 2006/0101022 | A1 | 5/2006 | Yu et al. |
| 2006/0149850 | A1* | 7/2006 | Bowman ................ G11B 27/10 709/205 |
| 2006/0161621 | A1 | 7/2006 | Rosenberg |
| 2006/0174312 | A1 | 8/2006 | Ducheneaut et al. |
| 2006/0236352 | A1 | 10/2006 | Scott |
| 2006/0271960 | A1 | 11/2006 | Jacoby et al. |
| 2007/0157281 | A1* | 7/2007 | Ellis .................. H04N 21/4147 725/74 |
| 2007/0229651 | A1 | 10/2007 | Nakajima |
| 2007/0283380 | A1 | 12/2007 | Aoki et al. |
| 2008/0037785 | A1 | 2/2008 | Gantman et al. |
| 2008/0163285 | A1 | 7/2008 | Tanaka et al. |
| 2009/0063983 | A1 | 3/2009 | Amidon et al. |
| 2009/0089840 | A1* | 4/2009 | Shusman ............. H04N 21/854 725/51 |
| 2009/0167839 | A1 | 7/2009 | Ottmar |
| 2009/0205008 | A1 | 8/2009 | Wollmershauser et al. |
| 2009/0319885 | A1 | 12/2009 | Amento et al. |
| 2009/0327428 | A1 | 12/2009 | Ramanathan et al. |
| 2010/0066804 | A1 | 3/2010 | Shoemake et al. |
| 2010/0281108 | A1 | 11/2010 | Cohen |
| 2010/0306671 | A1* | 12/2010 | Mattingly ................ H04L 9/40 715/834 |
| 2011/0016172 | A1 | 1/2011 | Shah |
| 2011/0069940 | A1* | 3/2011 | Shimy ............. H04N 21/42201 386/296 |
| 2011/0154417 | A1 | 6/2011 | Civanlar et al. |
| 2011/0219307 | A1 | 9/2011 | Mate et al. |
| 2011/0246908 | A1 | 10/2011 | Akram et al. |
| 2012/0131110 | A1 | 5/2012 | Buyukkoc et al. |
| 2012/0151345 | A1 | 6/2012 | McClements, IV |
| 2012/0216300 | A1 | 8/2012 | Vivolo et al. |
| 2012/0218262 | A1 | 8/2012 | Yomdin et al. |
| 2012/0246679 | A1 | 9/2012 | Chen |
| 2012/0296972 | A1 | 11/2012 | Backer |
| 2013/0016955 | A1 | 1/2013 | Pejaver |
| 2013/0031192 | A1 | 1/2013 | Caspi |
| 2013/0058632 | A1 | 3/2013 | Jackson |
| 2013/0103814 | A1 | 4/2013 | Carrasco et al. |
| 2013/0173765 | A1* | 7/2013 | Korbecki ......... H04N 21/42209 709/221 |
| 2014/0068692 | A1* | 3/2014 | Archibong ......... H04N 21/6334 725/116 |
| 2014/0071344 | A1 | 3/2014 | Francisco |
| 2014/0096167 | A1 | 4/2014 | Lang et al. |
| 2014/0150002 | A1* | 5/2014 | Hough .............. H04N 21/4532 725/9 |
| 2014/0195675 | A1 | 7/2014 | Silver |
| 2014/0205261 | A1 | 7/2014 | Courtemanche |
| 2014/0269757 | A1* | 9/2014 | Park .................... H04L 49/201 370/432 |
| 2014/0325557 | A1 | 10/2014 | Evans et al. |
| 2015/0052571 | A1 | 2/2015 | Stokking et al. |
| 2015/0106360 | A1 | 4/2015 | Cao et al. |
| 2015/0172338 | A1 | 6/2015 | Moran et al. |
| 2015/0215352 | A1 | 7/2015 | Wong et al. |
| 2015/0230004 | A1 | 8/2015 | VanDuyn et al. |
| 2015/0245106 | A1 | 8/2015 | Tian |
| 2015/0327024 | A1* | 11/2015 | Yang ..................... H04W 4/06 370/312 |
| 2016/0006981 | A1* | 1/2016 | Bauman ............. H04N 21/4788 348/14.03 |
| 2016/0021153 | A1 | 1/2016 | Hull et al. |
| 2016/0044622 | A1 | 2/2016 | Crowe et al. |
| 2016/0050160 | A1* | 2/2016 | Li ..................... H04L 65/4038 713/176 |
| 2016/0182928 | A1 | 6/2016 | Francisco |
| 2016/0241652 | A1 | 8/2016 | Frazier et al. |
| 2016/0255041 | A1 | 9/2016 | Lew et al. |
| 2016/0294894 | A1 | 10/2016 | Miller |
| 2016/0366203 | A1* | 12/2016 | Blong .................. H04L 65/612 |
| 2017/0006322 | A1* | 1/2017 | Dury ................... H04N 21/254 |
| 2017/0093769 | A1 | 3/2017 | Lind et al. |
| 2017/0103664 | A1 | 4/2017 | Wong et al. |
| 2017/0264920 | A1* | 9/2017 | Mickelsen .......... G06V 40/174 |
| 2017/0312626 | A1* | 11/2017 | Colenbrander ....... A63F 13/355 |
| 2017/0346926 | A1* | 11/2017 | Charters ................ G06F 9/453 |
| 2018/0035136 | A1 | 2/2018 | Crowe |
| 2018/0131681 | A1 | 5/2018 | Husser |
| 2018/0167427 | A1* | 6/2018 | Kedenburg, III ...... G06Q 50/01 |
| 2018/0192000 | A1* | 7/2018 | Mercredi ............... G06Q 50/01 |
| 2018/0288467 | A1 | 10/2018 | Holmberg et al. |
| 2018/0316939 | A1 | 11/2018 | Todd |
| 2018/0330756 | A1 | 11/2018 | MacDonald |
| 2018/0365232 | A1 | 12/2018 | Lewis et al. |
| 2019/0124159 | A1* | 4/2019 | Alsina ................ H04N 21/6125 |
| 2019/0147841 | A1 | 5/2019 | Zatepyakin et al. |
| 2019/0155934 | A1 | 5/2019 | Delaney et al. |
| 2019/0179610 | A1 | 6/2019 | Aiken et al. |
| 2019/0200054 | A1 | 6/2019 | Dharmaji |
| 2019/0253742 | A1 | 8/2019 | Garten et al. |
| 2019/0303874 | A1 | 10/2019 | Yang et al. |
| 2019/0321720 | A1 | 10/2019 | Nomura et al. |
| 2020/0029117 | A1 | 1/2020 | Kalva et al. |
| 2020/0053312 | A1* | 2/2020 | Mukherjee ............. H05B 47/19 |
| 2020/0112753 | A1 | 4/2020 | Stockhammer et al. |
| 2020/0275149 | A1* | 8/2020 | Su ........................ H04N 21/643 |
| 2020/0402541 | A1 | 12/2020 | Talbot et al. |
| 2021/0001236 | A1* | 1/2021 | Srinivasan ............ G07F 17/326 |
| 2021/0006864 | A1* | 1/2021 | Xu ...................... H04N 21/2187 |
| 2021/0035559 | A1* | 2/2021 | Xu ........................ G10L 15/063 |

(56) References Cited

U.S. PATENT DOCUMENTS

| | | | |
|---|---|---|---|
| 2021/0036979 | A1 | 2/2021 | Madduluri et al. |
| 2021/0037290 | A1 | 2/2021 | Madduluri |
| 2021/0037295 | A1* | 2/2021 | Strickland .......... H04N 21/6582 |
| 2021/0051034 | A1 | 2/2021 | Jonas et al. |
| 2021/0266621 | A1 | 8/2021 | Marten |
| 2021/0321159 | A1 | 10/2021 | Aggarwal et al. |
| 2022/0029825 | A1 | 1/2022 | Uhr et al. |
| 2022/0066621 | A1* | 3/2022 | Appelbaum .......... G06F 3/1454 |
| 2022/0070524 | A1 | 3/2022 | Iyer et al. |
| 2022/0103873 | A1* | 3/2022 | Yoshida ............. H04N 21/2387 |
| 2022/0132214 | A1 | 4/2022 | Felman |
| 2022/0139383 | A1 | 5/2022 | Rose et al. |
| 2022/0141500 | A1* | 5/2022 | Du ....................... H04N 21/488 725/116 |
| 2022/0166815 | A1* | 5/2022 | Gratton ............ H04N 21/25875 |
| 2022/0174357 | A1* | 6/2022 | Zavesky .......... H04N 21/44213 |
| 2022/0224659 | A1 | 7/2022 | El Ghazzal |
| 2022/0248080 | A1 | 8/2022 | Strickland |
| 2022/0256231 | A1 | 8/2022 | Eniwumide |
| 2022/0377413 | A1* | 11/2022 | Lidaka ............... H04N 21/4756 |
| 2022/0408161 | A1* | 12/2022 | Garten ............... H04N 21/4307 |
| 2023/0147705 | A1 | 5/2023 | Huertas et al. |
| 2023/0214510 | A1 | 7/2023 | Vijayakumar et al. |
| 2023/0214780 | A1 | 7/2023 | Fong et al. |
| 2023/0247067 | A1 | 8/2023 | Adams et al. |
| 2023/0362461 | A1 | 11/2023 | Marten |
| 2024/0040178 | A1 | 2/2024 | Marten |
| 2024/0064356 | A1 | 2/2024 | Marten |

FOREIGN PATENT DOCUMENTS

| | | | |
|---|---|---|---|
| WO | PCTIB2021057835 | | 8/2021 |
| WO | 2022049466 | A1 | 3/2022 |

OTHER PUBLICATIONS

U.S. Appl. No. 16/706,764, Ntc Allowance, dated Sep. 8, 2022.
U.S. Appl. No. 17/087,815, Notice of Allowability dated Sep. 9, 2022.
U.S. Appl. No. 17/336,416, Response to Non-final Office Action, dated Sep. 12, 2022.
U.S. Appl. No. 17/336,416, filed Jun. 2, 2021, Neil Marten.
U.S. Appl. No. 17/376,459, filed Jul. 15, 2021, Neil Marten.
U.S. Appl. No. 17/543,852, filed Dec. 7, 2021, Ross Alan Drennan.
U.S. Appl. No. 17/543,886, filed Dec. 7, 2021, Neil Marten.
U.S. Appl. No. 17/543,925, filed Dec. 7, 2021, Neil Marten.
U.S. Appl. No. 17/840,966, filed Jun. 15, 2022, Ram Madduluri.
U.S. Appl. No. 62/880,573, filed Jul. 30, 2019, Ramgopal Madduluri.
"Be anyone and reface anything"—downloaded from the Internet on Nov. 3, 2021 from https://hey.reface.ai/.
A. Colaco, I. Kim and C. Schmandt, "Back Talk: An auditory environment for sociable television viewing," 2011 IEEE Consumer Communications and Networking Conference (CCNC), 2011, pp. 352-356, doi: 10.1109/CCNC.2011.5766489. (Year: 2011).
ATSC Standard: ATSC 3.0 System, Doc. A/300:2019, Sep. 17, 2019.
DeepFace Lab for Windows, downloaded from the Internet on Nov. 3, 2021 from https://deepfacelab.en.softonic.com/.
Faceswap, downloaded from the Internet on Nov. 3, 2021 from https://faceswap.dev/.
Family Fun with Deepfakes . . . , downloaded from the Internet on Oct. 23, 2021, from https://towardsdatascience.com/family-fun-with-deepfakes-or-how-i-got-my-wife-onto-the-tonight-show-a4554775c011.
PCT/IB2021/057835, Int'l Search Report and Written Opinion, Jan. 27, 2022.
PCT/IB2021/057835, Invitation to pay Additional Fees and Preliminary International Search Results.
U.S. Appl. No. 15/788,058, Prosecution History through Jul. 19, 2022.
U.S. Appl. No. 16/706,686, Application as filed, Dec. 7, 2019.
U.S. Appl. No. 16/706,686, Non-Final Office Action, Mailed May 12, 2021.
U.S. Appl. No. 16/706,686, Filed Dec. 7, 2019, prosecution history.
U.S. Appl. No. 16/706,764, Non-Final Office Action, Jun. 10, 2021.
U.S. Appl. No. 16/706,764, Application as filed, Dec. 8, 2019.
U.S. Appl. No. 16/706,764, Non-Final Office Action Response, Sep. 7, 2021.
U.S. Appl. No. 16/706,764, RCE, Jul. 19, 2022.
U.S. Appl. No. 16/801,277, filed Feb. 26, 2020.
U.S. Appl. No. 17/087,815, filed Nov. 3, 2020.
U.S. Appl. No. 17/087,815, Non-Final Office Action, dated Feb. 24, 2022.
U.S. Appl. No. 17/087,815, Response to Non-Final Office Action, dated May 23, 2022.
U.S. Appl. No. 17/336,416, filed Jun. 2, 2021.
U.S. Appl. No. 17/336,416, Non-final Office Action, dated Jun. 16, 2021.
U.S. Appl. No. 17/376,459, filed Jul. 15, 2021.
U.S. Appl. No. 17/376,459, Final Office Action, dated May 2, 2022.
U.S. Appl. No. 17/376,459, Non-Final Office Action, dated Dec. 17, 2021.
U.S. Appl. No. 17/376,459, RCE and Response to Final Office Action, dated Jul. 5, 2022.
U.S. Appl. No. 17/376,459, Response to Non-final Office Action, dated Mar. 5, 2022.
U.S. Appl. No. 17/543,852, filed Dec. 7, 2021.
U.S. Appl. No. 17/543,886, filed Dec. 7, 2021.
U.S. Appl. No. 17/543,925, filed Dec. 7, 2021.
U.S. Appl. No. 62/880,580.
U.S. Appl. No. 16/706,764, Notice of Allowability, dated May 11, 2023.
U.S. Appl. No. 16/801,277, RCE and response to Final Office Action, dated Mar. 21, 2023.
U.S. Appl. No. 17/336,416, RCE and Response to Final Office Action, dated Apr. 4, 2023.
U.S. Appl. No. 17/376,459, Notice of Allowance, dated Apr. 24, 2023.
U.S. Appl. No. 17/376,459, Response to Final Office Action, dated Mar. 29, 2023.
U.S. Appl. No. 17/543,852, Response to Non-Final Office Action, dated Apr. 3, 2023.
U.S. Appl. No. 17/543,886, Response to Non-Final Office Action, dated Apr. 5, 2023.
U.S. Appl. No. 17/543,852, Final Office Action, dated May 26, 2022.
U.S. Appl. No. 17/543,886, Final Office Action, dated May 25, 2023.
U.S. Appl. No. 17/543,925, Non-final Office Action Response, dated May 29, 2023.
M. O. van Deventer, H. Stokking, M. Hammond, J. Le Feuvre and P. Cesar, "Standards for multi-stream and multi-device media synchronization," in IEEE Communications Magazine, vol. 54, No. 3, pp. 16-21, Mar. 2016, doi: 10.1109/MCOM.2016.7432166. (Year: 2016).
U.S. Appl. No. 18/094,369, filed Jan. 8, 2023.
U.S. Appl. No. 16/706,764, Prosecution Reopened, Jan. 4, 2023.
U.S. Appl. No. 16/801,277, Final Office Action, dated Dec. 23, 2022.
U.S. Appl. No. 17/336,416, Final Office Action, dated Jan. 9, 2022.
U.S. Appl. No. 17/543,886, Non-Final Office Action, dated Dec. 19, 2022.
U.S. Appl. No. 17/543,925, Non-final Office Action, dated Jan. 31, 2023.
U.S. Appl. No. 15/788,058, Request for Continued Examination, Amendment and IDS, dated Nov. 3, 2022.
U.S. Appl. No. 15/788,058, Notice of Allowance dated Nov. 30, 2022.
U.S. Appl. No. 16/801,277, Response to non-final Office Action, dated Nov. 28, 2022.
U.S. Appl. No. 17/376,459, Final Office Action, dated Dec. 1, 2022.
U.S. Appl. No. 17/376,459, Response to Non-final Office Action, dated Oct. 11, 2022.

(56) References Cited

OTHER PUBLICATIONS

U.S. Appl. No. 17/543,852, Non-Final Office Action, dated Dec. 5, 2022.
U.S. Appl. No. 16/706,764, filed Dec. 8, 2019.
U.S. Appl. No. 17/840,966, filed Jun. 15, 2022.
U.S. Appl. No. 16/801,277, filed Feb. 6, 2020.
U.S. Appl. No. 17/087,815, filed Nov. 3, 2020, Satish Balasubramanian Iyer.
U.S. Appl. No. 16/706,764, Issue Fee Paid, Jun. 15, 2022.
U.S. Appl. No. 16/706,764, Notice of Allowance, dated Mar. 17, 2022.
U.S. Appl. No. 16/801,277, Non-Final Office Action, dated Aug. 30, 2022.
U.S. Appl. No. 17/087,815, Notice of Allowance, dated Sep. 1, 2022.
U.S. Appl. No. 17/376,459, Non-final Office Action, dated Jul. 29, 2022.
U.S. Appl. No. 18/094,369, Non-Final Office Action, Jun. 8, 2023.
U.S. Appl. No. 17/336,416, Non-Final Office Action, Jul. 28, 2023.
U.S. Appl. No. 17/543,852, RCE and Response to Non-Final Office Action, Aug. 22, 2023.
U.S. Appl. No. 17/543,886, RCE and Response to Final Office Action, Aug. 21, 2023.
U.S. Appl. No. 17/543,925, Notice of Allowance and Examiner Interview Summary, Jul. 27, 2023.
U.S. Appl. No. 18/094,369, Response to non-final Office Action with Terrminal Disclaimer, Aug. 22, 2023.
U.S. Appl. No. 18/363,897, Application as filed Aug. 2, 2023.
U.S. Appl. No. 16/801,277, Notice of Allowance & Interview Summary, Jul. 12, 2023.
U.S. Appl. No. 16/801,277, Supplemental Amendment & Interview Summary, Jun. 27, 2023.
U.S. Appl. No. 17/543,925, Final Office Action, Jul. 7, 2023.
U.S. Appl. No. 17/543,925, Response to Final Office Action and eTerminal Disclaimer, Jul. 8, 2023.
U.S. Appl. No. 18/222,453, Continuation application as filed Jul. 16, 2023.
U.S. Appl. No. 17/543,852, Notice of Allowance, Sep. 8, 2023.
U.S. Appl. No. 17/543,886, non-final Office Action, Sep. 14, 2023.
U.S. Appl. No. 16/801,277, Feb. 6, 2020.
U.S. Appl. No. 18/314,987, May 10, 2023.
U.S. Appl. No. 18/314,987, Non-Final Office Action, Sep. 13, 2023.
U.S. Appl. No. 18/484,241, Application filed, Oct. 10, 2023.
U.S. Appl. No. 17/336,416, Non-Final Office Action Response, Oct. 23, 2023.
U.S. Appl. No. 18/222,453, Notice of Publication, Nov. 9, 2023.
U.S. Appl. No. 17/336,416, Final Office Action, Dec. 22, 2023.
U.S. Appl. No. 17/336,416, Response to Final Office Action, Jan. 9, 2024.
U.S. Appl. No. 17/543,886, Response to non-final Office Action, Jan. 5, 2024.
U.S. Appl. No. 17/840,966, Response to non-final Office Action, Jan. 5, 2024.
U.S. Appl. No. 18/094,369, Final Office Action, Nov. 29, 2023.
U.S. Appl. No. 18/314,987, Applicant Initiated Interview Summary, dated Nov. 17, 2023.
U.S. Appl. No. 18/314,987, Response to Non-Final Ofice Action, dated Dec. 13, 2023.
U.S. Appl. No. 17/840,966, Jun. 15, 2022.
U.S. Appl. No. 18/484,241, Oct. 10, 2023.
U.S. Appl. No. 18/094,369, Jan. 8, 2023.
U.S. Appl. No. 18/222,453, Jul. 16, 2023.
U.S. Appl. No. 17/336,416, Jun. 2, 2021.
U.S. Appl. No. 17/543,852, Dec. 7, 2021.
U.S. Appl. No. 17/543,886, Dec. 7, 2021.
U.S. Appl. No. 17/543,925, Dec. 7, 2021.
U.S. Appl. No. 18/363,897, Aug. 2, 2023.
U.S. Appl. No. 18/314,987, filed May 10, 2023.
U.S. Appl. No. 17/336,416, Advisory Action, Jan. 29, 2024.
U.S. Appl. No. 17/336,416, RCE, Jan. 29, 2024.
U.S. Appl. No. 17/336,416, Non-Final Office Action, Feb. 22, 2024.
U.S. Appl. No. 17/543,886, Final Office Action, Feb. 15, 2024.
U.S. Appl. No. 18/094,369, Notice of Allowance, Feb. 14, 2024.
U.S. Appl. No. 18/094,369, Response to Final Office Action, Jan. 27, 2024.
U.S. Appl. No. 18/18,484,241, Notice of Publication, Feb. 2, 2024.
U.S. Appl. No. 17/840,966, Non-Final Office Action Oct. 19, 2023.
U.S. Appl. No. 18/314,987, Notice of Allowance, dated Feb. 27, 2024.

* cited by examiner

USER CHOSEN WATCH PARTIES

CROSS-REFERENCE TO RELATED APPLICATIONS

The present application is related to the following applications, the entire contents of which are incorporated herein by reference:

U.S. patent application Ser. No. 16/706,686, filed no Dec. 7, 2019, in the name of inventor R. Madduluri, and entitled "Devices, Systems and Processes for Providing Engaging Content Environments," (the "'686 App."), and which has been abandoned;

U.S. patent application Ser. No. 15/788,058, filed on Oct. 19, 2017, in the name of inventor B. Husser, entitled "User to User Content Authentication," (the "'058 App."), and which is presently pending;

U.S. patent application Ser. No. 16/706,765, filed on Dec. 8, 2019, in the name of inventors R. Madduluri et al, entitled "Devices, Systems and Processes for Providing Geo-Located and Content-to-Comment Synchronized User Circles," (the "'765 App."), and which has been allowed;

U.S. patent application Ser. No. 17/840,966, filed on Jun. 16, 2022, in the name of inventors R. Madduluri et al, entitled "Geo-Located and Content-to-Comment Synchronized User Circles," (the "'966 App."), and which is presently pending;

U.S. patent application Ser. No. 16/801,9277 filed on Feb. 26, 2020, in the name of inventor N. Marten, entitled "Devices, Systems and Processes for Facilitating Watch Parties," (the "'277 App."), and which is presently pending;

U.S. patent application Ser. No. 17/087,815 filed on Nov. 3, 2020, in the name of inventors S. Iyer, et al., entitled "Devices, Systems and Processes for Facilitating Live and Recorded Content Watch Parties," (the "'815 App."), and which is presently pending;

U.S. patent application Ser. No. 17/376,459 filed on Jul. 15, 2021, in the name of inventor N. Marten, entitled "Interactive Media Events," (the "'459 App."), and which is presently pending;

U.S. patent application Ser. No. 17/336,416 filed on Jun. 2, 2021, in the name of inventor N. Marten, entitled "Consolidated Watch Parties," (the "'416 App."), and which is presently pending;

U.S. patent application Ser. No. 17/543,852 filed on Dec. 7, 2021, in the name of inventors R. Drennan et al., entitled "Cell Phone Content Watch Parties," (the "'852 App."), and which is presently pending;

U.S. patent application Ser. No. 17/543,886, filed on Dec. 7, 2021, in the name of inventors N. Marten et al, entitled "Karaoke Content Watch Parties," (the "'886 App."), and which is presently pending; and U.S. patent application Ser. No. 17/543,925, filed on Dec. 7, 2021, in the name of inventors N. Marten et al., entitled "Deepfake Content Watch Parties," (the "'925 App."), and which is presently pending.

TECHNICAL FIELD

The technology described herein generally relates to devices, systems, and processes for facilitating sharing of audio sounds and/or video images of participants in a watch user chosen watch party.

BACKGROUND

Today, various systems, methods, and devices have been described which enable multiple, physically remote persons to be presented with content and user reactions thereto, at substantially the same time. Multiple implementations of such systems, etc. are described, for example, in the U.S. Patent Applications identified above.

For example, and not by limitation of any claim or subject matter claimed and/or disclosed therein, the '277 App. describes, in part, various implementations of watch parties including an implementation where a camera may be focused upon a first user at a first location and images captured by such camera may be then provided for viewing by other users at other locations; such other locations being remote from the location of the first user. For further example, the '686 App. describes, in part, various implementations by which a first user may share their reactions to content, including visible reactions, with other remote users participating in a "user circle" (as further described in the '686 App.). The '686 App. also describe uses of cameras in a user device or otherwise to capture a user's reactions to content, and for sharing such reactions to others. The '815 App. describes various implementations for facilitating watch parties and the substantially simultaneous presentation of video capturing a first user's reactions to content with other remote users. The '459 App. describes various implementations for facilitating interactive media events. The '416 App. describes various implementation for facilitating later arising consolidated presentations of watch parties and interactive media events. The '852 App. describes various implementation for facilitating watch parties using cell phone content. The '886 App. describes various implementation for facilitating watch parties using karaoke content. The '925 App. describes various implementation for facilitating watch parties using Deepfake content.

In common, each of the above applications describe approaches where the underlying primary content of a watch party is selected by a host or the like. Yet, multiple participants in a given watch party may desire to be presented with other primary content. Accordingly, a need exists for watch parties in which the users choose which primary content to be presented with during a given watch party. The various implementations of the present disclosure address these and other needs.

SUMMARY

Various implementations are described of devices, systems, and processes for facilitating user chosen watch parties, where primary content presented during a watch party is selected based on inputs received from two or more users participating in a given watch party.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

For at least one implementation, a server may include a processor and a data store coupled to the processor, storing non-transient server computer instructions. The server may be communicatively coupled with at least one content provider and with a set of at least two user devices. The non-transient server computer instructions, when executed by the processor, may instruct the server to perform operations that may include: initiating a user choice watch party (UCWP); receiving a request to designate a first user device, from the set of at least two user devices, as a primary user choice user device (PUCUD) for the UCWP; first designating the first user device as the PUCUD. The operations may also include first querying the set of at least two user devices for one or more second user devices to participate in the UCWP as one or more secondary user choice user devices (SUCUD). The operations may also include, when a result of the querying may be positive, second designating positively responding user device, from the set of at least two user devices, as SUCUDs. The operations may also include repeating the first querying and second designating operations for each user device in the set of at least two user devices and ending the UCWP when a result of the querying may be a negative for the set of at least two user devices. The operations may also include generating a user choice interface (UCI) and retrieving two or more user choice primary content (UCPC) options. The operations may also include instructing the PUCUD and the one or more SUCUDs to output for presentation to respective users the two or more UCPC options, receiving at least two user choices, and determining, based on the at least two user choices and from the two more UCPC options, a selection result indicating a chosen UCPC option to present during the UCWP. The operations may also include presenting the chosen UCPC to the set of at least two user devices during the UCWP. Other embodiments of this aspect include corresponding computer systems, apparatus, and computer programs recorded on one or more computer storage devices, each configured to perform the actions of the methods.

Implementations may include one or more of the following features. The server operation of retrieving two or more UCPC options may include retrieving the two or more UCPC options from at least one of a data store and a content provider. At least one of the two or more UCPC segments may include a movie poster. The at least one of the two or more UCPC segments may include a movie trailer. The operation of retrieving two or more UCPC options may include filtering the two or more UCPC options based on at least one digital rights management (DRM) rights associated with a given UCPC identified by the two or more UCPC options and DRM rights associated with the PUCUD and the SUCUDs.

For at least one implementation, the at least two user choices include a primary choice from the PUCUD and a secondary choice from one of the one or more SUCUDs. The operations of receiving the at least two user choices may include receiving user reactions to the two or more UCPC options. The user reactions may be respectively captured by content capture devices (CCDs) respectively coupled to the PUCUD and the one or more SUCUDs. The operations may include ranking the two or more UCPC options based on the user reactions.

The operations of receiving the at least two user choices further may include presenting the user reactions in the UCI, and where the CCDs respectively capture, in a video format, the user reactions, for the user of the PUCUD or the one or more SUCUDs, to the two or more UCPC options. The operations further may include monitoring, during the presenting the chosen UCPC to the set of at least two user devices, for user reactions, classifying the user reactions, and generating, based on the user reactions, an engagement score for the chosen UCPC option. The engagement score may be generated based upon a given user's reaction to at least one aspect of the chosen UCPC option. The at least one aspect may include dialog, drama, action, plot, character development, drama, and scariness. Implementations of the described techniques may include hardware, a method or process, or computer software on a computer-accessible medium.

For at least one implementation, a method may include receiving a request to designate a first user device, from a set of at least two user devices, as a primary user choice user device (PUCUD) for a user choice watch party (UCWP). The method may include first designating the first user device as the PUCUD, first querying the set of at least two user devices for one or more second user devices to participate in the UCWP as one or more secondary user choice user devices (SUCUD), and when a result of the querying may be positive, second designating positively responding user device, from the set of at least two user devices, as SUCUDs. The method may include repeating the first querying and second designating operations for each user device in the set of at least two user devices and ending the UCWP when a result of the querying may be a negative for the set of at least two user devices. The method may include generating a user choice interface (UCI) for presentation to respective users of the PUCUD and the one or more SUCUDs, retrieving two or more user choice primary content (UCPC) options, instructing the PUCUD and the one or more SUCUDs to output for presentation to respective users the two or more UCPC options, receiving at least two user choices, determining, based on the at least two user choices and from the two more UCPC options, a selection result indicating a chosen UCPC option to present during the UCWP, and presenting the chosen UCPC to the set of at least two user devices during the UCWP. Other embodiments of this aspect include corresponding computer systems, apparatus, and computer programs recorded on one or more computer storage devices, each configured to perform the actions of the methods.

Implementations may include one or more of the following features. The method may include retrieving the two or more UCPC options from at least one of a data store and a content provider. The two or more UCPC segments may include a portion of a soundtrack. The method may include filtering the two or more UCPC options based on at least one digital rights management (DRM) rights associated with a given UCPC identified by the two or more UCPC options and DRM rights associated with the PUCUD and the SUCUDs. The user reactions may be respectively captured by content capture devices (CCDs) respectively coupled to the PUCUD and the one or more SUCUDs. The ranking of the two or more UCPC options may be based on the user reactions. At least one of the CCDs may be configured to respectively capture, in a video format, the user reactions, for the user of the PUCUD or the one or more SUCUDs, to the two or more UCPC options. The method may include monitoring, during the presenting the chosen UCPC to the set of at least two user devices, for user reactions, classifying the user reactions, and generating, based on the user reactions, an engagement score for the chosen UCPC option. The engagement score may be generated based upon a given user's reaction to at least one aspect of the chosen UCPC option. Implementations of the described techniques may include hardware, a method or process, or computer software on a computer-accessible medium.

For at least one implementation, a non-transitory computer readable medium may include instructions that include generating a user choice interface (UCI) for presentation to respective users of a primary user choice user device (PUCUD) and one or more secondary user choice user devices (SUCUDs), retrieving two or more user choice primary content (UCPC) options, instructing the PUCUD and the one or more SUCUDs to output, for presentation to respective users, the two or more UCPC options, receiving at least two user choices, determining, based on the at least two user choices and from the two more UCPC options, a selection result indicating a chosen UCPC to present during a user choice watch party (UCWP), and presenting, during the UCWP, the chosen UCPC to the PUCUD and the one or more SUCUDs. Other embodiments of this aspect include corresponding computer systems, apparatus, and computer programs recorded on one or more computer storage devices, each configured to perform the actions of the methods.

Implementations may include one or more of the following features. The non-transitory computer readable medium may include instructions for operations that further may include receiving user reactions for the two or more UCPC options. The user reactions may be respectively captured by content capture devices (CCDs) respectively coupled to the PUCUD and the one or more SUCUDs. The operations may further include ranking the two or more UCPC options based on the user reactions. Implementations of the described techniques may include hardware, a method or process, or computer software on a computer-accessible medium.

BRIEF DESCRIPTION OF THE DRAWINGS

The features, aspects, advantages, functions, modules, and components of the devices, systems and processes provided by the various implementations of implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference number irrespective of any additional alphabetic designators or second reference labels, if any.

DETAILED DESCRIPTION

Figure 1:
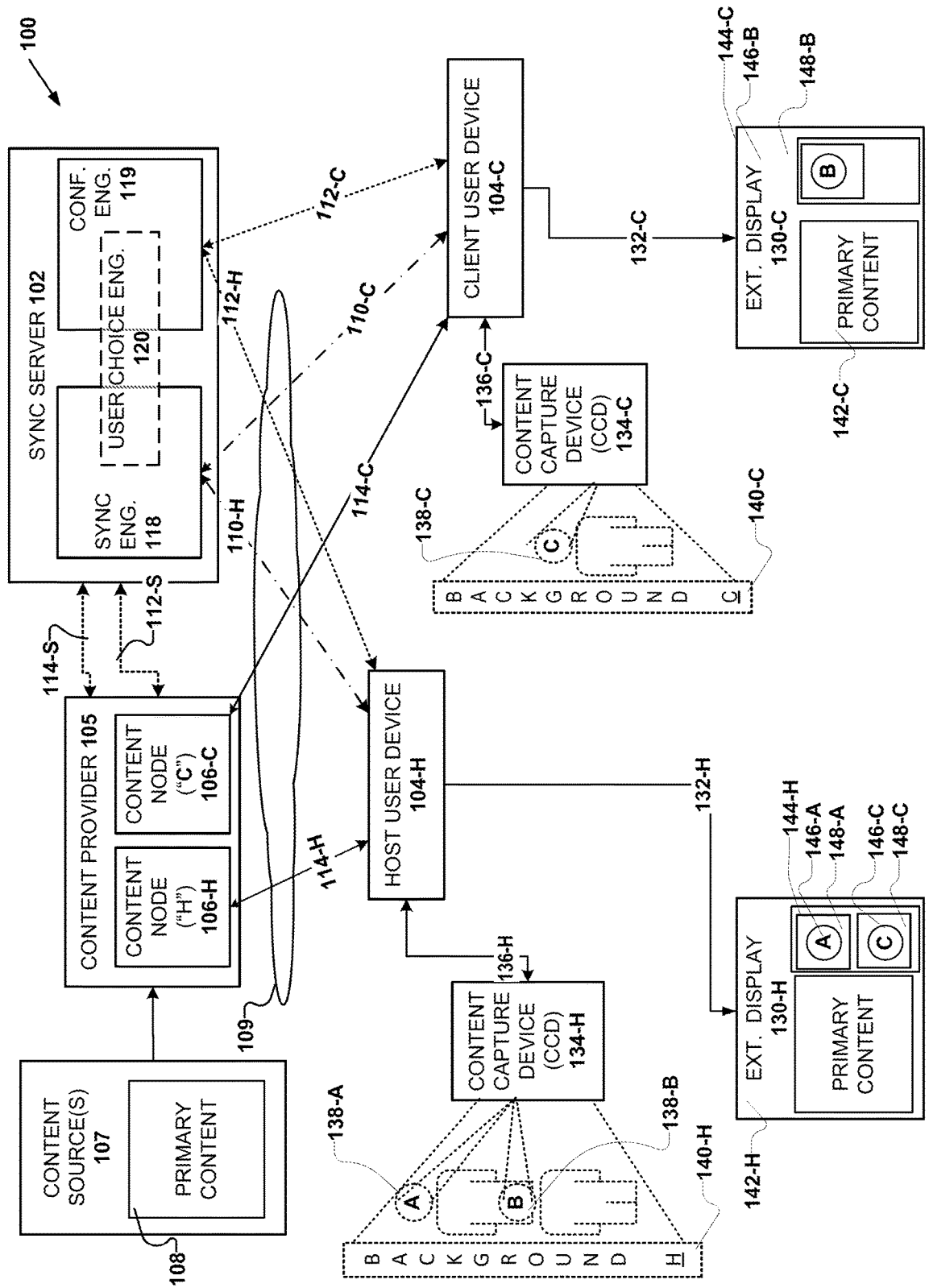
FIG. 1 is a schematic illustration of a system for facilitating user chosen watch parties and in accordance with at least one implementation of the present disclosure.

Various implementations of the present disclosure describe devices, systems, and processes for facilitating a user chosen watch party.

"Cloud" herein refers to cloud computing, cloud storage, cloud communications, and/or other technology resources which a given user does not actively manage or provide. A usage of a Cloud resource may be private (limited to certain users and/or uses), public (available for many users and/or uses), hybrid, dedicated, non-dedicated, or otherwise. It is to be appreciated that implementations of the present disclosure may use Cloud resources to provide for processing, storage and other functions related to facilitating live cell phone watch parties.

"Collaboratively" herein refers to a given users' reaction(s) to the live and/or recorded content may be captured and shared with other users participating in a user chosen watch party within an expected delay period, if any, with the user's actual reaction.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Content" herein refers to any information that may be presented, using a suitable presentation device, to a user in a humanly perceptible format. Non-limiting examples of content include videos, television programs, audio programs, speeches, concerts, gaming images and graphics, or otherwise. Content may include, for example and not by limitation, one or more of sounds, images, video, graphics, gestures, or otherwise. The content may originate from any source, including live and/or recorded, augmented reality, virtual reality, computer generated, or otherwise. The content may be presented to a given user using any user device. Content may be made available by a producer, publisher, distributor, a user, or other source of such content. For example, a producer for a new television series may initiate a user chosen watch party ("UCWP") available to select combinations of user devices. A UCWP may be used for promotional purposes. A UCWP may be used for any other lawful purpose; non-limiting examples including gambling, sporting contests, shopping, educational and training, cooking, or otherwise. Content includes one or more segments and one or more elements.

"Content capture device" ("CCD") herein refers to a device configured to capture one or more reactions. Non-limiting examples of CCDs include video cameras and microphones provided separately, individually, collectively or otherwise on, with and/or configured for use electronic devices smart glasses, smartphones, tablets and the like, body cameras such as GOPROS and the like, drone cameras, video cameras, and the like. A reaction may occur by a user in response to a primary content and/or a secondary content and is captured by a CCD.

Data" (which is also referred to herein as a "computer data") herein refers to any representation of facts, information or concepts in a form suitable for processing by one or more electronic device processors and which, while and/or upon being processed, cause or result in an electronic device or other device to perform at least one function, task, operation, provide a result, or otherwise. Computer data may exist in a transient and/or non-transient form, as determined by any given use of such computer data.

"Delay" herein refers to a period of time after a first event before a second event occurs. For a non-limiting example, a delay may occur between a presentation of a primary content segment and a reaction during a UCWP. A delay may occur for a pre-determined, dynamically determined, or otherwise determined length of time. A delay may be quantified using any metric, such as transmission time, presentation time, received versus sent time, latency, or otherwise. For at least one implementation, a given delay may be less than one second (1 sec) after a given live presentation of a content segment during a UCWP. For at least one implementation, a given delay may be less than ten seconds (10 sec) after a live presentation of a content segment during a UCWP. For another implementation, a given delay may be determined based on a quantification of one or more networked communications characteristics occurring during a given UCWP. It is to be appreciated that such one or more networked communications characteristics may vary over time and with use thereof.

For a non-limiting example, a given delay may be determined, dynamically or otherwise, based on an average network latency for one or more user devices attending a given media event, a worst-case latency for a given user device attending the UCWP, based upon bandwidth constraints, data processing constraints of one or more user devices, or otherwise. A delay may include a waiting period that ends upon a conclusion of a given live presentation of content during a UCWP. A delay may end after a live sporting event concludes. A delay may include a waiting period that ends upon a conclusion of a given presentation of a live or recorded content segment.

"Element" (which is also referred to herein as a "content element") herein refers to a humanly perceptible and uniquely identifiable portion of one or more content segments. For a non-limiting example, an audio content element for a segment of a motion picture may include humanly perceptible audio tracks, such as audio tracks for one or more actors, instruments, sound effects, or otherwise provided in a primary content. Non-limiting examples of motion picture audio tracks may include: actor dialogue tracks; a scene track providing, e.g., sounds such as traffic noise, birds chirping, actors screaming, or otherwise; an audience track, e.g., a laugh track or an applause track; a musical instrument track, e.g., a drum track, a lead guitar track, a rhythm guitar track, a piano/organ/synthesizer track, a sound effects track, one or more orchestral instrument tracks, one or more choir tracks; and other audible tracks.

"High quality" herein refers to audio-video (A/V) content (for example and not by limitation) means that the content is transmitted by a content source directly, for example using a direct satellite connection, or indirectly, for example, using a network, to a user device at three or more megabytes per second (3 MBPS), at a video resolution equal to or greater than the 720 p "high definition television" ("HDTV") standard. For at least one implementation, high quality may include the use of adaptive bit rate ("ABR") transmission technologies. Such ABR technologies may be configured to provide content at a "low latency" while using a varying video resolution over time. "Medium quality" means AV content that is transmitted by a content source to a user device at a "standard definition television" (SDTV) standard.

"(In)directly" herein refers to a transmission of a given content from a source to a given user device may be direct, such as occurs with radio and satellite broadcast television signals, or indirect, such as occurs with streaming and over-the-top (OTT) transmissions. Indirect transmissions may include use of various network technologies, including Cloud technologies.

"Instruction" (which is also referred to herein as a "computer instruction") herein refers to a non-transient processor executable instruction, associated data structure, sequence of operations, program modules, or the like. An instruction is described by an instruction set. It is commonly appreciated that instruction sets are often processor specific and accordingly an instruction may be executed by a processor in an assembly language or machine language format that is translated from a higher level programming language. An instruction may be provided using any form of known or later arising programming; non-limiting examples including declarative programming, imperative programming, functional programming, procedural programming, stack based programming, object-oriented programming, and otherwise.

"Live" herein refers to a transmission and presentation of a primary content to two or more users that occurs at or within one minute of a first availability of such primary content for presentation to such two or more users.

"Low latency" herein refers to a transmission of content from a source to a user device with less than a one second delay between the time of transmission of the content by the source and reception of such content by the user device.

"Media event" herein refers to a combination of primary content and synchronization information for such primary content.

"Module" herein refers to and, when claimed, recites definite structure for an electrical/electronic device that is configured to provide at least one feature and/or output signal and/or perform at least one function including the features, output signals and functions described herein. Such a module may provide the one or more functions using computer engines, processors, computer instructions and the like. When a feature, output signal and/or function is provided, in whole or in part, using a processor, one more software components may be used and a given module may be include a processor configured to execute computer instructions. A person of ordinary skill in the art (a "POSITA") will appreciate that the specific hardware and/or computer instructions used for a given implementation will depend upon the functions to be accomplished by a given module. Likewise, a POSITA will appreciate that such computer instructions may be provided in firmware, as embedded software, provided in a remote and/or local data store, accessed from other sources on an as needed basis, or otherwise. Any known or later arising technologies may be used to provide a given module and the features and functions supported therein.

"Primary Content" herein refers to content provided by a content source for presentation to multiple users using one or more user devices. Primary content may have any form, format, length, duration, or the like and includes segments and elements thereof.

"Processor" herein refers to one or more known or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units;

multi-core ARM based processors; microprocessors, microcontrollers; and the like. Processors may be implemented in single or parallel or other implementation structures, including distributed, Cloud based, and otherwise.

"Reaction" herein refers to a response, by a user, to primary content and/or secondary content. The reaction may be to one or more primary content segments and/or secondary content segments. A reaction may be imperceptible to others, for example, an elevated heart rate of a given user. A reaction may be perceptible to others, for example, an outburst of sounds, motion (e.g., hand waving), or otherwise by a given user. A reaction may be ephemeral, ongoing, or otherwise.

"Real-time" herein refers to a presentation of a primary content segment and secondary content where such presentation occurs substantially simultaneously based upon when such primary content segment is first available for presentation to a user, via a user device, such as at the time of the primary content segments first generation. A real-time presentation may include a primary content segment being presented on a live or on a recorded basis to one or more users via a compatible presentation device (such as a television or video display), after a given delay period (for example, a two-second delay period), or otherwise. For a non-limiting example, a UCWP of a football match captured and presented as one or more primary content segments chosen by two or users and where the selection of the primary content occurs real-time when one or more users may view the primary content and the UCWP content segments, using a sound system, television or other content presentation device, at substantially the same time (while accounting for data processing and transmission delays and other delay periods) as a spectator, in a viewing stands, could view the match. For example, during a UCWP of multiple sporting events occurring substantially simultaneously, as may occur for example, during an annual MARCH MADNESS college basketball tourney, WORLD CUP Football tourney, OLYMPIC games, or otherwise, user reactions to primary content and/or secondary content may be used by a system to determine which presentation stream of a multiple sporting events to present to all, or a given segment of, participants to a UCWP, at a given time.

"Recorded" herein refers to primary content first available to two or more users and where such primary content is delayed and/or later presented to two or more users more than one minute after the first availability of such content, such as, on an on-demand, time delayed, or other basis.

"Secondary Content" herein refers to content provided by another entity, such as a user, an artificial intelligence, or otherwise in reaction, response, based upon, or otherwise in view of (herein, "responsive") a given primary content and/or another secondary content. Secondary content may include one or more user reactions to primary content and/or to other reactions. Secondary content may include other information, generated by any entity, such as statistics, background information regarding primary content, information regarding a reaction, or otherwise. Secondary content may be captured and presented in any format, non-limiting examples including audio/video formats, text based formats, and otherwise. Secondary content may be humanly perceptible or imperceptible. For an implementation, secondary content may include reactions captured as chat data.

"Segment" (also referred to as a "content segment") herein refers to a delineable portion of content. For a non-limiting example, a content may include audio and video for an entire football game. A content segment may include the audio and video for a given scoring play for the football game.

"Separately" when referring to two or more users participating in a UCWP, herein refers to a first user may be physically or virtually separated from one or more second users such that a user is uniquely and independently provided a given content, such as a primary content provided by a content provider. Such separation may include a geographic separation, wherein a first user is in a different room, building, city, state, or country than one or more second users. A separation may occur virtually, such as when a first user receives the content and/or reaction(s) as presented, in whole or in part, in a first format (such as an audible portion of the football game in a first language), while a second user receives content and/or reactions in a second format (such as the audible portion of the football game being provided in a second language). For at least one implementation, separation may occur one or more of geographically and virtually.

"Substantially simultaneous(ly)" herein refers to an absence of a greater than expected and humanly perceptible delay between a first event or condition, such as a presentation of a primary content, and a second event or condition, such as a presentation of secondary content, to two or more users using their respective user devices. Substantial simultaneity may vary in a range of quickest to slowest expected delay, to a moderate delay, or to a longer delay. That is a humanly perceptible delay for a given UCWP may be larger and satisfy a substantially simultaneous subjective and acceptable threshold than might be deemed to be unacceptable for a non-UCWP, such as a watch party in which the primary content is not chosen by multiple users voting, reactions to, interest in, or otherwise regarding a chosen content from a plurality of primary content choices available at a given time. It is to be appreciated that the subject and acceptable threshold of substantial simultaneity is also distance, data processing, and data communication capabilities dependent. For example, a UCWP conducted using gigabit Ethernet capable local area network (LAN) connections may have a shorter acceptable delay period (and a more stringent substantially simultaneous requirement) than may apply to a UCWP conducted over a 3G network, where data communications are knowingly slower and thus a given (longer) delay period may satisfy a subject substantially simultaneous threshold.

"User chosen watch party" ("UCWP") herein refers to a form of a watch party where users choose the primary content (herein, the user chosen primary content, "UCPC") to be presented at a given time. During a UCWP, inputs from two or more users may be used to determine which content segments (including primary content and/or secondary content segments) to present to the users participating in the Party. A UCWP may include the presentation of audio and video, for a given UCWPC, to users with low latency and at high quality.

"UCWP Content" ("UCWPC") herein refers to the UCPC and any secondary content presented during a UCWP.

"Watch party" ("WP") (which is also referred to as a "Party") herein refers to a substantially simultaneous and separate presentation of content, and one or more user reactions thereto, to each of two or more users. During a Party, primary content and secondary content is presented to two or more separate users, where the secondary content includes audio content, video content or other content captured by a user's content capture device and such secondary content is selectively processed in view of one or more preferences for a given Party and/or in view of one or more user preferences. A Party may include one or more of the features and functions taught in one or more of the applications identified in the Cross-Reference to Related Applications herein above.

For at least one implementation, UCWPs may be used for sporting contests, such as MARCH MADNESS, the OLYMPICS, the WORLD CUP, FORMULA 1 races, or otherwise to facilitate common viewing of real-time content of particular interest to two or more users. For example, last minute action in a basketball game may be presented to multiple users during a watch UCWP. Content may be stored, transmitted, processed or otherwise manipulated in non-humanly perceptible formats that may be converted, by known and later arising devices, systems and methods, into humanly perceptible information presented by a suitable presentation device. Current implementations of such presentation devices are well known any suitable known or later arising presentation device may be used for content presentation to users.

UCWP Systems 100

As shown in FIG. 1, a system 100 for facilitating a UCWP may include a sync server 102. The sync server 102 may be communicatively coupled by a communications network 109, such as one that utilizes in whole or in part the Internet, a Cloud, or otherwise, to two or more user devices ("UD") 104, such as one or more host UDs ("HUDs") 104-H and one or more client user devices ("CUDs") 104-C, using sync links 110-H/C and conference links 112-H/C.

The sync server 102 and two or more UDs 104 may be communicatively coupled to at least one content node 106. A content node 106 may be associated with a content provider 105 that receives primary content 108 from a content source 107.

Such communicative coupling of a UD 104 with a content node 106, such as content nodes 106-H and 106-C may include use of content links 114, such as a host content link 114-H, a client content link 114-C, and a server content link 114-S. A UD 104 and/or the sync server 102 may be separately coupled to a content node 106 by a content link 114. More than one UD 104 may be coupled to a given content node 106.

A UD 104 may be coupled to one or more CCDs 134, such as a host CCD 134-H and a client CCD 134-C. CCDs 134 may be configured to capture reactions, such as user data 138. CCDs 134 may capture background content and provide the same as a background data 140. As used herein, "user data 138" and "background data 140" may include any form of content captured by a given one or more CCD(s), with non-limiting examples including audio content and/or video content. A CCD 134 may be configured to capture audio data, such as lyrics sung by the first user "A" or the like. A CCD 140 may be configured to capture any form or forms of user data 138 and/or background data 140 during a UCWP.

A UD 104 may be coupled to a given CCD 134 using a CCD link 136, such as a host CCD link 136-H or a client CCD link 136-C. For a non-limiting example, an image of user's head or face, such as those for a first user "A" a second user "B" or a third user "C" may be provided as respective first user data 138-A, second user data 138-B and third user data 138-C. Further, one or more background data 140, such as a host background data 140-H or a client background data 140-C, may be captured by one or more CCDs 134 and provided to a UD 104 for further data processing, storage, and the like.

Sync Server 102

Figure 2:
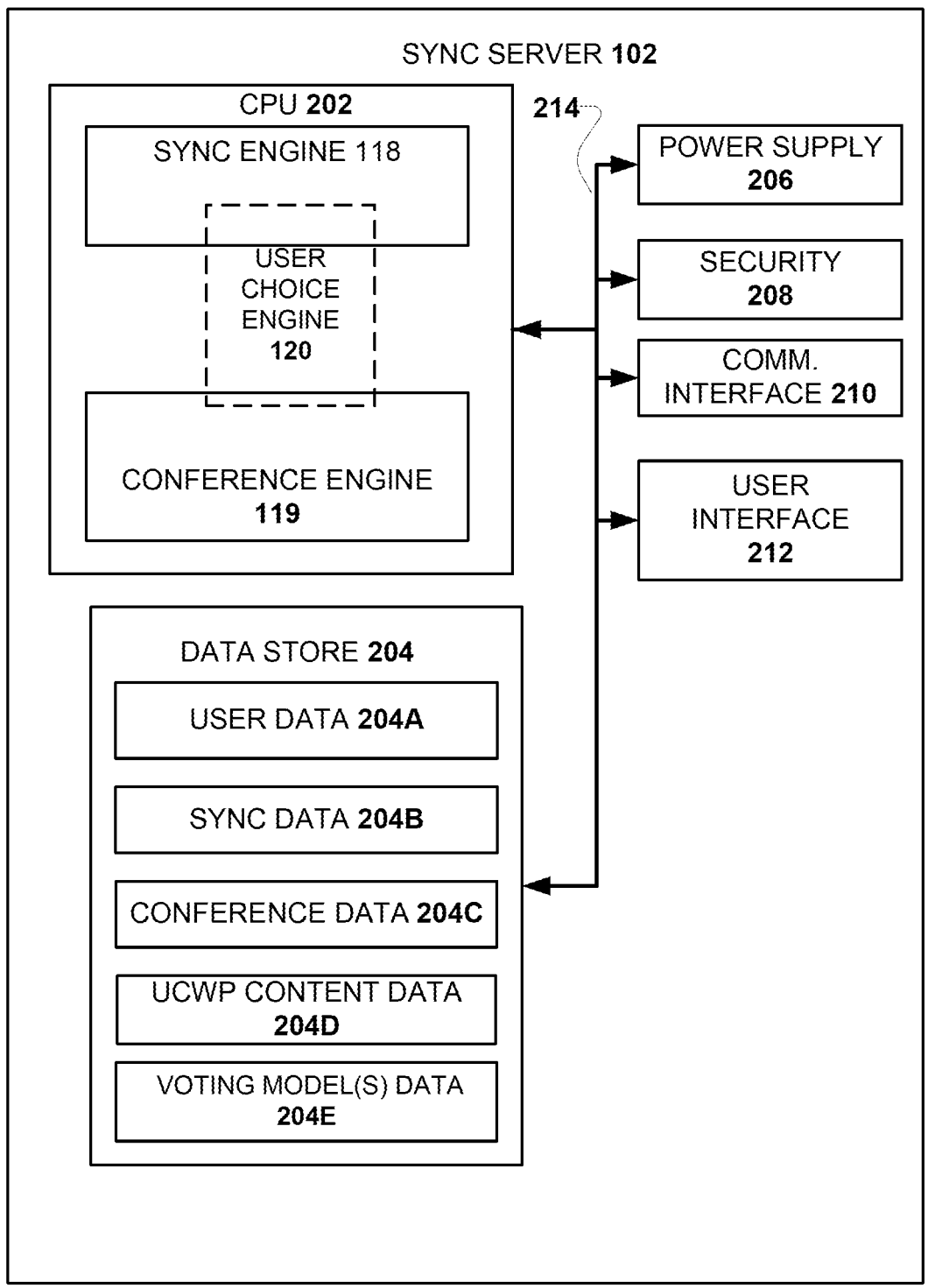
FIG. 2 is a schematic illustration of synch server for facilitating user chosen watch parties and in accordance with at least one implementation of the present disclosure.

As shown in FIGS. 1 and 2, the sync server 102 may include a server CPU 202 executing two or more computer engines including a server sync engine 118, a server conference engine 119, and a server user choice engine 120, a server data store 204, a server power supply 206, a server security 208, a server communications interface 210 and a server user interface 212. One or more of the logics facilitated by the computer engines may be combined, included, not included, distributed across one or more sync servers 102 and/or provided by one or more engines. It is to be appreciated that engines may be provided separately, collectively, or otherwise by one or more correspondingly configured physical devices, systems, and/or collection of devices and systems.

Server CPU 202

A sync server 102 may include a processor (herein, identified as a server central processing unit (CPU) or "server CPU" 202). Any known or later arising processor may be used. The server CPU 202 may be provided by a processing device capable facilitating one or more logics by executing one more computer instructions with respect to computer data. One or more of the server engines such as the server sync engine 118 and the server conference engine 119 may be executed by one or more threads on the server CPU 202, or otherwise. The server CPU 202 may include one or more physical components configured for such data processing operations. Any known or later arising technologies may be utilized in conjunction with an implementation of the present disclosure to facilitate the server CPU 202, the server sync engine 118, the server conference engine 119, and the server user choice engine 120.

A sync server 102 may instantiate one or more computer engines as one or more threads operating on a computing system having a multiple threaded operating system, such as the WINDOWS 10 operating system, LINUX, APPLE OS, ANDROID, and others, as an application program on a given device, as a web service, or otherwise. An Application Program Interface (API) may be used to support an implementation of the present disclosure. A sync server 102 may be provided in the virtual domain and/or in the physical domain. A sync server 102 may be associated with a human user, a machine process executing on one or more computing devices, an API, a web service, instantiated on the Cloud, distributed across multiple computing devices, or otherwise. A sync server 102 may be any electronic device configurable to communicate data using a network, directly or indirectly, to another device, to another server, or otherwise.

The server CPU 202 may be communicatively coupled, by a server data bus 214 or similar structure, to other components of the sync server 102 including, but not limited to, a server data store 204, which may also be referred to as a "computer readable storage medium."

Server Sync Engine 118

Figure 3:
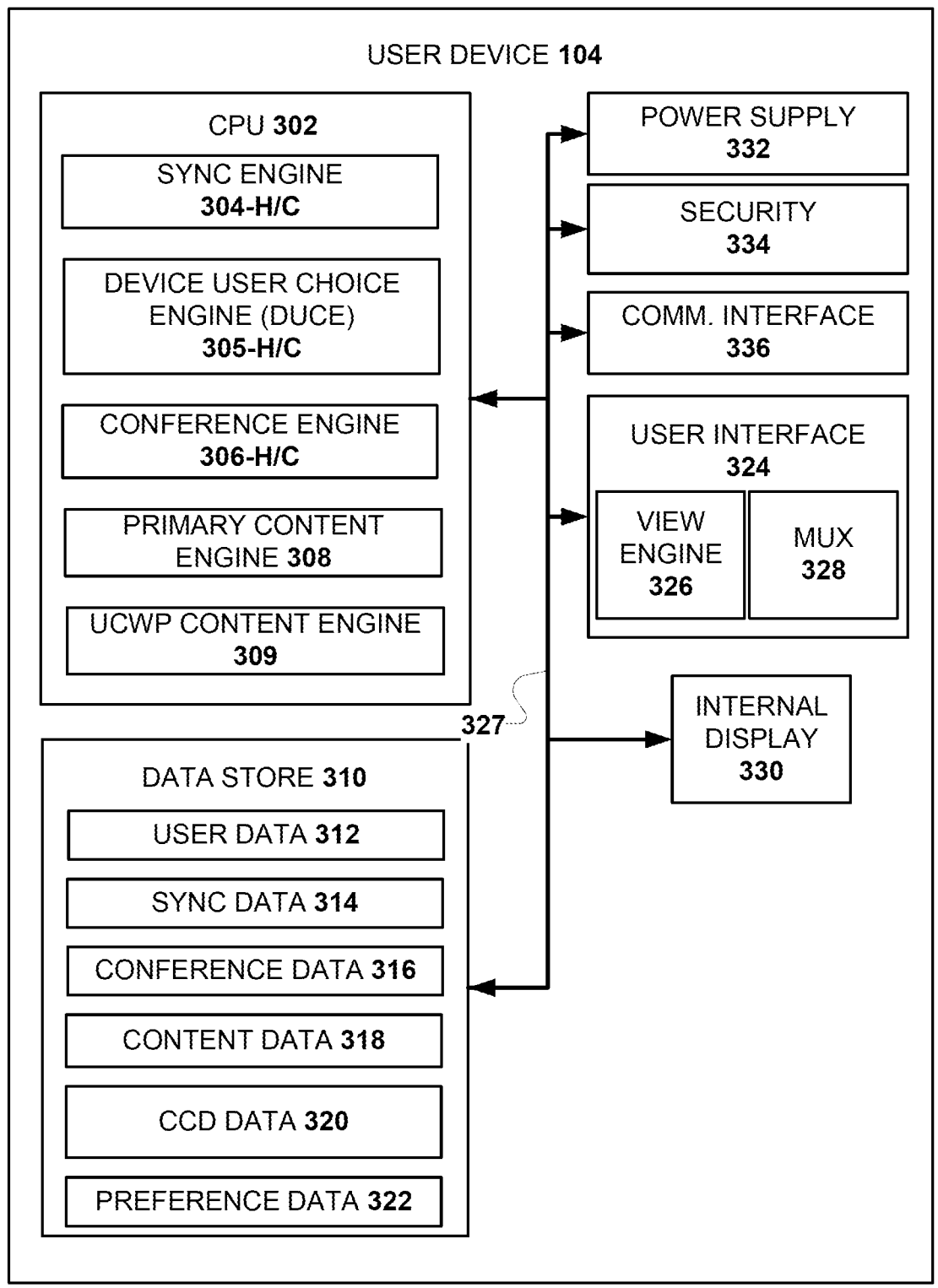
FIG. 3 is a schematic illustration of a user device for facilitating user chosen watch parties and in accordance with at least one implementation of the present disclosure.
Figure 4A:
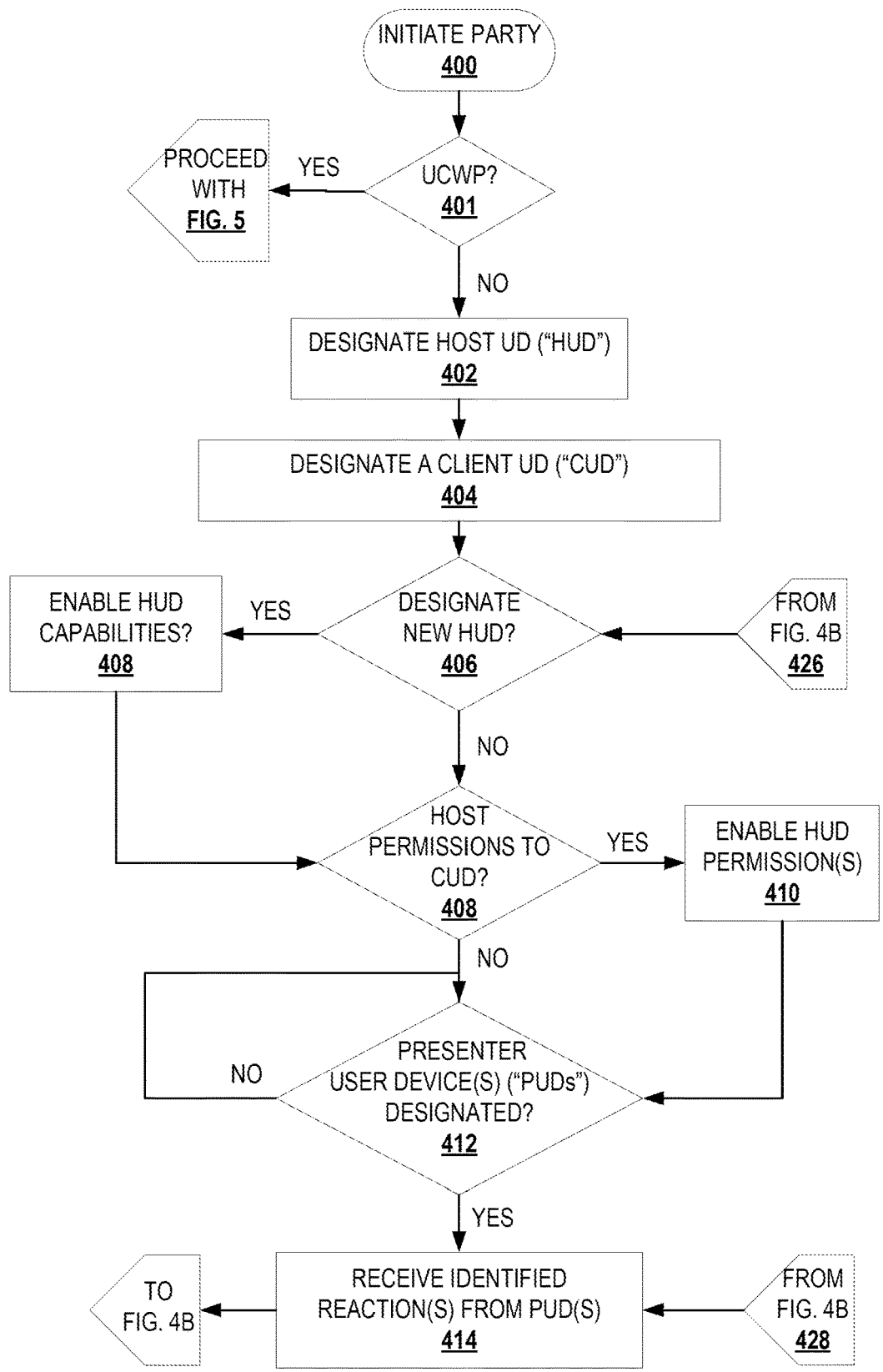
FIGS. 4A and 4B illustrate a process for implementing a user chosen watch UCWP and in accordance with at least one implementation of the present disclosure.
Figure 4B:
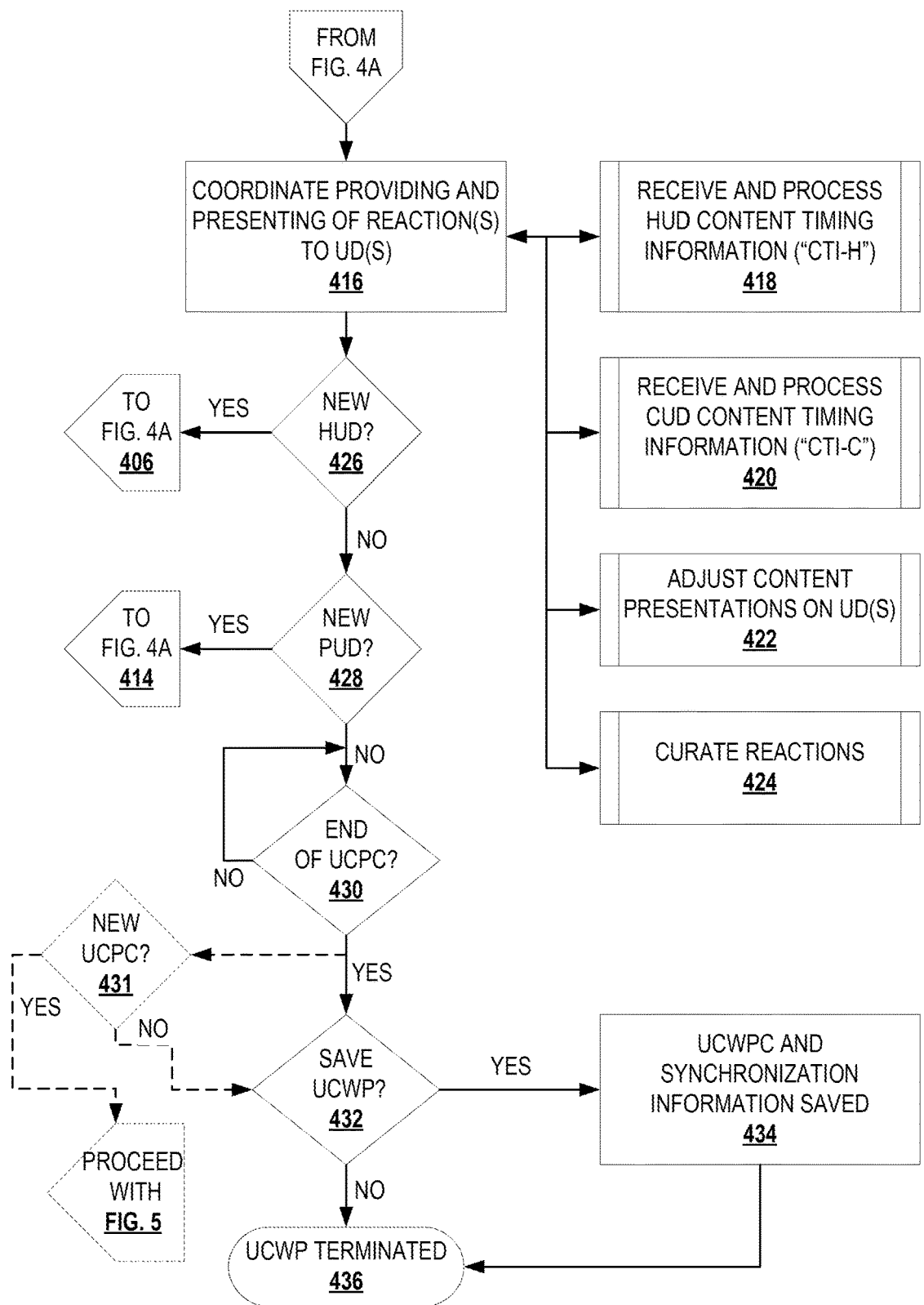

With reference to FIGS. 1, 2, 3, 4A and 4B, a server sync engine 118 manages synchronization of primary content and secondary content during a UCWP. For at least one implementation, operations of the server sync engine and/or server conference engine are shown in FIGS. 4A and 4B. Such operations are non-limiting and for at least one implementation of a UCWP. Other operations, sequences thereof, combinations, and/or permutations thereof may be used in accordance with other implementations of the present disclosure.

Figure 5:
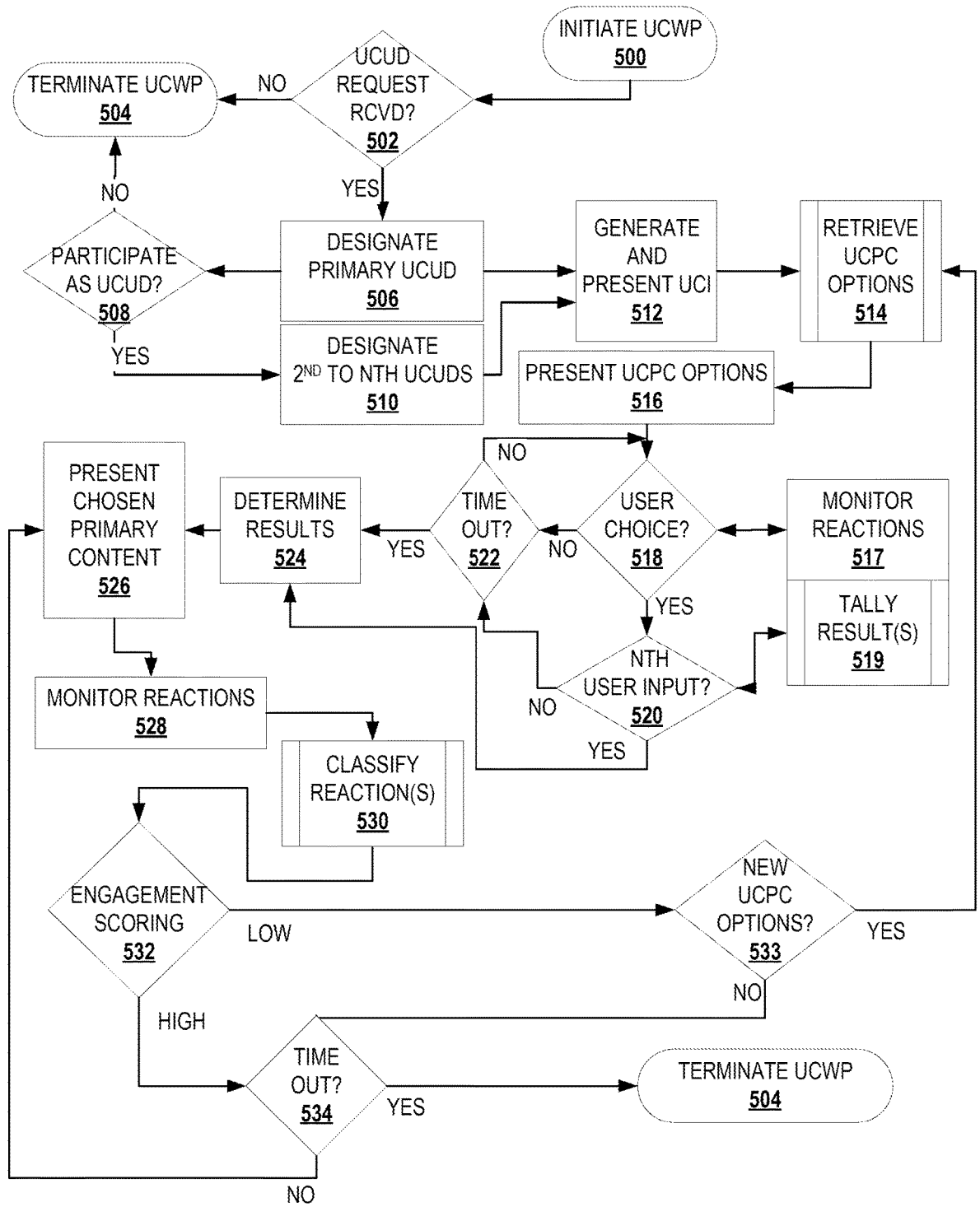
FIG. 5 illustrates a process for implementing a user chosen watch party and in accordance with at least one implementation of the present disclosure.

The server sync engine 118 also manages, in conjunction with the server user choice engine 120, synchronization of UCWPC during a UCWP. For at least one implementation, such operations are shown in FIG. 5 and are further described herein.

When a UCWP is initiated (as shown per Operation 400) the server sync engine 118 will request and receive status and other synchronization information regarding the communication of UCWPC and other content to and from a UD 104. A UD 104 during a UCWP executes their UD sync engines 304 (as described herein), and provide the information used to synchronize the providing of content during a UCWP. Various operations of a server sync engine 118 and UD sync engines 304 to so synchronize content are described in the '815 Application with particular reference to FIGS. 3A-3E therein, such description is incorporated herein by reference. As shown per Operation 401, the process may include serial and/or parallel operations may occur which respectively utilize the server user choice engine 120 for a UCWP, as described herein and with references to FIG. 5.

As described below with reference to FIG. 5, one or more UDs 104 participating in a UCWP may be designated to vote on or otherwise participate in a selection of (herein, "vote") UCPC for a given UCWP. The voting may occur before and/or during a UCWP.

Synchronization information is communicated by and between the sync server 102 (and the server sync engine 118) and the UD sync engines 304 using the two or more sync links 110 (as shown in FIG. 1). The providing of UCWPC between UDs 104, the sync server 102, and other content during a UCWP is facilitated by a server conference engine 119 and respective conference engines 306 (as described herein). The server sync engine 118 synchronizes the providing and presenting of UCWPC by two or more UDs 104 during a UCWP. As described herein, such UCWPC may be provided by content sources 107, UDs 104 (as secondary content) and otherwise, where the content provided is based on inputs from two or more users participating in a given UCWP.

A UCWP may be established by the sync server 102 with respect to a given UCPC. For an implementation, multiple UCWPs may be established with respect to a given UCPC. A given UD 104 may be configured to participate in one or more of such multiple UCWPs, and the server sync engine 118 may be configured to monitor and identify UDs 104 participating in a given UCWP, at a given time. A UCWP may include a subset of UDs 104 otherwise participating in a collection of UCWPs for a given event and/or for a given UCWP.

As shown per Operation 402 and for at least one implementation of a UCWP, the process may include the server sync engine 118 synchronizing UCWPCs by designating a given UD 104 as a "host" user device 104-H (or "HUD"). A given UD 104 may be designated, by a sync server 102 (with corresponding designations being implemented by UD sync engine(s) 304) as a HUD 104-H for multiple UCWPCs. For example, a professional sports league, such as the NFL, may be designated as an IUD, while a team may be designated as a HUD 104-H for a live and/or recorded presentation of a sporting event, with multiple Parties being established for multiple users of disparate locations, interests, languages, or otherwise.

As shown per Operation 404, the process may include one or more remaining UDs in a given UCWP being designated as a "client" user device 104-C(or "CUD"). For an implementation, at least one UD 104 is designated as the HUD 104-H during the entirety of a UCWP and at least one UD 104 is designated as a CUD 104-C.

As shown per Operation 406, the process may include, at any given time, the server sync engine 118 being configured to designate another UD 104, such as CUD 104-C, as the HUD 104-H. For example, and not by limitation, as when a prior HUD 104-H is no longer participating in a given UCWP, the server sync engine 118 may designate CUD 104-C as the HUD 104-H.

When an existing HUD 104-H is disconnected from a UCWP, the server sync engine 118 may be configured to immediately, after an elapsing of a pre-determined or otherwise determined period, or based on some other period, event, or otherwise, suspend, and/or cancel, the UCWP until a HUD 104-H is able to rejoin or continue in a HUD capacity.

As shown per Operation 408, the process may include, when designated as a HUD 104-H, a previously designated CUD 104-C being configured to include the one or more capabilities of a HUD 104-H. Such capabilities may be activated, download, or otherwise made available to the newly designated HUD 104-H using a user device sync engine 304-H/C.

For an implementation, designations of UDs as HUDs and/or CUDs may be made by the server sync server 118 (in conjunction with a HUD sync engine) by a then active and/or an initiating HUD 104-H so requesting. As used herein, an initiating HUD (or "IUD") is a user device that initiated a UCWP by sending one or more invites to other UDs to participate in a given UCWP. An IUD is designated as a HUD for a given UCWP unless a redesignation of a UD as a HUD occurs before, during, or after a UCWP.

As shown per Operation 410, the process may include, when designated, a server sync engine 118 enabling one or more host functions, features, permissions and the like (herein, "HUD permissions") on the new HUD. For at least one implementation, the server sync engine 118 (in conjunction with the newly designated UD sync engine 304) configures the new HUD to implement such one or more HUD permissions. The server sync engine 118 may implement fail-over and other designation rules (as set forth in computer data and/or computer instructions) governing if and when re-designation of a CUD 104-C as a HUD 104-H is to occur for a UCWP.

As shown per Operation 412, the process may include the server sync engine 118, separately and/or upon request by an active HUD 104-H and/or an IUD, designating one or more CUDs 104-C as a presenter device ("PUD"). Herein, a PUD is a UD by which a user (herein, such person being a "presenter" and/or a "presenting user") provides a "reaction" (as described above) during a UCWP. Multiple PUDs may be designated singularly and/or in a plurality and at any time during a UCWP.

A given UD 104 may be designated, by an active server sync engine 118, as a HUD, a CUD, a hosting presenter (i.e., a user device then possessing, at a given time, the host and presenter designations), and/or a client presenter (i.e., a user device possessing, at a given time, the client and presenter designations). An IUD and/or a then active HUD 104-H may designate a given CUD 104-C as a PUD at any given time. Such designations may be revoked, transferred, or otherwise designated, at any time, by the server sync engine 118 in a then active HUD 104-H and/or by the IUD. PUD designations are implemented on one or more UDs participating in a UCWP.

As shown per Operation 414, the process may include reactions being captured by a PUD and identified (using a UD sync engine 304) to the server sync engine 118 for synchronization of presentation thereof on two or more UDs participating in the UCWP.

As shown per Operation 416, the process may include the server sync engine coordinating a providing and presentation of the reactions on the other UDs participating in the UCWP. As described herein, the reactions themselves are communicated, by the respective PUD conference engine 306, to the server conference engine 119, which then further distributes the reactions to one or more, if any, other UDs participating in the UCWP. The designating of PUDs and processing of reactions for a watch party are described in one or more of the applications identified above; such descriptions are again, incorporated herein by reference.

As shown per Operation 418, the process may include the server sync engine 118 (alone or in conjunction with UD sync engines 304) synchronizing presentations of UCWPC, including primary content and reactions, based upon "content timing information" associated with the HUD.

As used herein, "content timing information" (CTI) includes timing information provided by a designated user device to a sync server. For an implementation, various types of CTIs may be communicated by a UD sync engine 304 to the server sync engine 118. For another implementation, various CTIs may be estimated and/or otherwise determined by the server sync engine 118 based upon link characteristics and/or other information available to the server sync engine 118 at a given time. A CTI may be based on a uniquely identifiable portion of a UCPC segment, or element thereof. A non-limiting example of a uniquely identifiable portion of a UCPC segment that includes a frame of A/V content capable of being independently rendered by a UD 104, is an "I" frame in a motion pictures expert group ("MPEG") group of pictures ("GOP"). Other approaches may be used to identify a UCPC segment or element thereof. For at least one implementation, MPEG compression algorithms and the like may be used for identifying UCPC segments and elements, regardless of source and may include secondary content captured by a CCD 134 or otherwise.

A non-limiting example of a CTI is a host CTI (a "CTI-H"), which indicates delays incurred between sending and/or actual times of receipt and/or presentation to a user of a given UCPC segment (and/or a secondary content segment) by a HUD 104-H. For an implementation, the CTI-H may be determined based on a "sent time" at which a given UCPC segment is sent to the HUD 104-H, plus any delay period incurred between the sent time and a later time at which the given UCPC segment is ready for presentation by the HUD 104-H to a user thereof. For an implementation, the sent time may be provided by synchronization information associated with the given UCPC segment. The CTI-H may account for one or more of delays including transmission delays, data processing delays, other synchronization delays, such as those specified by server, user initiated delays, such as a pause operation, or otherwise. For at least one implementation, CTI includes synchronization information plus any "delay period."

As used herein, "synchronization information" includes information which identifies a given point in time relative to a beginning and/or end of a given UCPC content or secondary content, a respective segment thereof, and/or a respective element of a respective segment. Non-limiting examples of "synchronization information" include audio/video ("A/V") frame synchronization data, universal time code ("UTC") data, content based data, metadata associated with a given content, or otherwise.

As shown per Operation 420, the process may include the server sync engine 118 (alone or in conjunction with UD sync engines 304) synchronizing UCWPC presentations based upon CTIs associated with two or more CUDs (herein, a "CTI-C"). A CTI-C is similar to a CTI-H and identifies delay periods incurred between a sending and/or actual times of receipt and/or presentation to a CUD user of a given UCPC segment (and/or a secondary content segment) by the given CUD 104-C. Unless adjusted by the server sync engine 118 (alone or in conjunction with UD sync engines 304), CIT-Cs will commonly vary across the various CUD 104-C participating in a UCWP.

As shown per Operation 422, the process may include, based on the CTI-H and the CTI-C(s), the server sync engine 118 (alone or in conjunction with UD sync engines 304) adjusting UCPC presentations across UDs participating in the given UCWP. For an implementation provides synchronization signals to the server conference engine 119 and/or to the conference engine 306 which adjust when a given UCWPC segment or element (or multiple UCWPC segments and/or elements) are provided to the CUDs 104-C participating in a UCWP. Two or more CTIC-Cs may be adjusted by the server sync engine 118 (alone or in conjunction with UD sync engines 304) such that a presentation time of a given UCPC segment and/or of a given secondary content segment (or elements thereof) at two or more CUDs participating in a given UCWP is synchronized across the multiple CUDs and with the HUD also participating in the given UCWP. Such adjustments may occur on any basis such as a one-time, a recurrent, as needed, scheduled interval, randomly, or other basis. For an implementation, a delay period for a first CUD (a "CTI-C1") may be lengthened, shortened, or otherwise adjusted (e.g., content time skipped, reversed, or the like) to accommodate a delay period experienced by a second CUD (a "CTI-C2"), and vice versa.

As shown per Operation 424, the process may include the server sync engine 118 (operating alone or in conjunction with UD sync engines 304 in a HUD 104-H and/or a PUD) one or more of identifying, filtering, curating, or otherwise selecting (herein, individually and collectively "curating") reactions. Such curation may include, for a non-limiting example, selecting user data 138 and/or background data 140 (from multiple instances thereof) to provide to other participating UDs 104 (for presentation to users thereof) at any given time during a UCWP. A PUD may identify how a given UCWPC is to be presented on one or more internal displays 330 and/or external displays 130 (as described herein) coupled to UDs 104. The server sync engine 118 (alone or in conjunction with UD sync engines 304) may designate which UDs 104 may provide reactions during a UCWP and how such reactions and other UCWPC are to be presented to a user via a given UD 104. It is to be appreciated, UCWPC may be presented to different users, via different UDs 104, based upon characteristics of the UDs, user preferences, communications links utilized, and otherwise.

As shown per Operation 426, the process may include the server sync engine 118 detecting when a new HUD is needed and/or requested, for example, by an IUD or a CUD. If so, the process may proceed with Operation 406.

As shown per Operation 428, the process may include the server sync engine 118 detecting when a new PUD is needed and/or requested, for example, by an HUD, IUD, or a CUD. If so, the process may proceed with Operation 414.

As shown per Operation 430, the process may include the server sync engine 118 detecting when a UCPC is to end. The ending of a UCPC may be based upon a request from a HUD or and IUD to terminate the UCWP, a scheduled end time, a cessation of a given UCPC being available, all of the content segments in a UCPC having been presented, or otherwise. The process may proceed in parallel with one or more of Operations 431 and 432. For at least one implementation Operation 431 may not be performed.

As shown per Operation 431, the process may include the server sync engine 118 querying a HUD 104-H as to whether a new UCPC is to be selected and presented during a UCWP. If "yes," the process may proceed with operations shown in FIG. 5. If "no," the process may proceed with Operation 432.

As shown per Operation 432, the process may include the server sync engine 118 determining whether UCWPC and/or other information, such as synchronization information utilized, user preferences or other computer data associated with a given UCWP is to be saved.

As shown per Operation 434, the process may include, when UCWPC and/or other information for a given UCWP is to be saved, the server sync engine 118 (alone and/or in conjunction with the server conference engine 119 and/or one or more content sources 107, HUDs 104-H, CUDs 104-C, and UD sync engines 304 and UD conference engines 306) saving of the UCWPC or portions thereof and other information. Such saving may include use of storage provided on the server, UDs, the Cloud, or otherwise.

As shown per Operation 434, the process may include the server sync engine 118 (operating alone or in conjunction with UD sync engines 304) terminating the UCWP. For at least one implementation, such terminating may include disconnection/de-establishing of the one or more sync links 110, conference links 112, primary content links 114 and/or secondary content links 116.

It is to be appreciated that the operations depicted in FIG. 4 are illustrative and are not intended herein to occur, for implementations of the present disclosure, in the order shown, in serial, or otherwise. One or more operations may be performed in parallel and operations may be not performed, as provided for a given responder. For example, a responder may be recalled back to their station even while an incident is on-going for rest, recovery, availability for other incidents, or otherwise.

Server Conference Engine 119

A server conference engine 119 facilitates collaboration by and between users, via their respective UDs 104, during a UCWP (alone and/or in conjunction with UD conference engines 306) by establishing and communicating UCWPC over two or more conference links 112. Conference links 112 may be provided separate of the sync links 110 or provided jointly therewith. Conference links 112 facilitate the distribution of UCWPC during a UCWP.

Collaboration by and between users (via their respective UDs 104) during a given UCWP may be decoupled from one or more of a providing of UCPC (by the content nodes 106 to the UDs 104) and/or any synchronization information used to facilitate synchronization of UCWPC presentations, as facilitated by the server sync engine 118. For example, a providing of cell phone reactions by and between UDs 104 may arise independently and be shared independently of other UCWP features and/or functions by use of the server conference engine 119 (alone and/or in conjunction with UD conference engines 306).

For an implementation, the server conference engine 119 (alone and/or in conjunction with UD conference engines 306) supports collaboration between users during a UCWP, via their respective UDs 104 and CCDs 134, in any humanly perceptible format; non-limiting examples including speech, video, text, emoticons, gestures, or otherwise. Conference links 112 and collaborative aspects of a UCWP may be established or unestablished at any time before, during, or after a given UCWP has been initiated by the server conference engine 119.

For an implementation, the server conference engine 119 (alone and/or in conjunction with UD conference engines 306) may leverage proprietary, custom, open source, or otherwise provided conferencing software applications and content distribution applications including, but not limited to, JITSI MEET, WEBEX, ZOOM, and otherwise.

For an implementation, the server conference engine 119 (alone and/or in conjunction with UD conference engines 306) utilizes conference data 204C provided, for example, by the server data store 204 to facilitate the providing of UCWPC during a UCWP. Conference data 204C may include any data and/or computer instructions which facilitate collaboration during a UCWP. Non-limiting examples of conference data 204C include communications sockets used by UDs 104, IP addresses for UDs, UD identifiers, such as MAC addresses, communications network settings used for one or more conference links 112 and otherwise. For an implementation, the server conference engine 119 (alone and/or in conjunction with UD conference engines 306) utilizes user data 204A to a facilitate collaboration during a UCWP.

Various instances of conference data 204C may be stored in the server data store 204 and used by the server conference engine 119 in facilitating collaboration during a UCWP. Non-limiting examples of conference data 204C include type of connection, distance of a given UD 104 from the sync server 102, maximum available bandwidth for a given conference link 112, throughput for the conference link 112, latency, and other data. Conference data 204C may be provided for conference link 112-H/C used during a UCWP to the server sync engine 118 for use in synchronization of UCWPC providing and presentation during a UCWP.

For an implementation, the server conference engine 119 stores user communications during a given UCWP as conference data 204C in the server data store 204. Such conference data may be time stamped and/or otherwise synchronized with respect to a given UCPC segment such that a later playback of the conference data and/or the given UCPC segment may include the conference data corresponding to such given UCPC segment, as such conference data was generated during the given UCWP. For example, a later viewing of the football program and a UCWP by an Nth user may include a presentation of the conference data arising between a HUD 104-H and a CUD 104-C during a prior arising UCWP. Such later synchronization and presentation of conference data 204C with one or more UCPC segments (and/or elements thereof) enable the user of the Nth CUD 104-C(N) to enjoy the prior arising UCWP at a later time and as if participating real-time in the UCWP occurring earlier.

A sub-conference link (not shown) may be provided as a sub-stream of the conference link 112. Data communicated over the sub-conference link may be adaptively bit-rate ("ABR") provided to the various users in a UCWP such that a user receives a given UCWPC at substantially the same time the user so reacted. The server conference engine 119 (alone and/or in conjunction with a UD conference engine 306 and/in coordination with the server sync engine 118) determines which data processing operations, such as ABR to apply to a given UCWPC segment or element thereof.

For example, a video camera focused upon a first user of a HUD 104-H may ABR stream images (and audio) of such first user to other second user's CUDs 104-C. A cell phone reaction of the first user, as presented to the second users, may be ABR at a different setting or level and processed so as to be in substantially simultaneous synch with the presentation of the given UCPC segment that resulted in the given cell phone reaction. A subconference link may be configured to utilize higher speed communications links than are used to facilitate one or more of the conference links 112 such that cell phone reactions to UCPC segments may be in substantially simultaneous synchronization with the UCPC segment during a UCWP. Subconference links and/or conference links 112 may be provided using networks supporting high band 5G communications.

For an implementation, the server conference engine 119 (alone and/or in conjunction with UD conference engines 306) may be configured to adaptively identify, using artificial intelligence, machine learning, and the like which of multiple user data 138 being captured by one or more CCDs 134 to provide to other UDs, such as a CUD 104-C, during a UCWP. For example, an image of user A's face 138-A, as captured, e.g., by a host CCD 134-H may be identified by a server conference engine 119 as including UCWPC segments that are to be communicated to one or more selected CUDs 104-C during one or more portions of a UCWP.

For another example, an image of user B's face 138-B, as captured, e.g., by a host CCD 134-H, may be identified by a server conference engine 119 for communication to other UDs, such as one or more CUDs 104-C, when a UCPC segment satisfies one or more criteria. For example, a non-limiting criteria may include user B's data 138-B being communicated when a first team scores a goal as identified in a given UCPC segment; another non-limiting criteria may be a given facial expression, such as when user B is speaking, grimacing, or otherwise; another non-limiting criteria may be based upon other secondary content, such as a noise, an indication of an event happening proximate to a given user, or otherwise.

For an implementation, the server conference engine 119 may be configured to modify one or more aspects of a given user data 138 and/or a given background data 140. For example, a user data 138 may include a logo of clothing manufacturer. Image portions (e.g., pixels) corresponding to such logo may be modified when the clothing manufacturer does not meet a given criteria—such as being a recognized promotor or sponsor of a given primary content, or otherwise. For example, a football match sponsored by NIKE may result in the server conference engine 119 obscuring logos presented in a user data 138 for other sponsors, such as ADDIDAS. A server conference engine 119 (alone and/or in conjunction with UD conference engines 306) may be configured to utilize artificial intelligence and/or machine learning to identify content to be obscured or otherwise modified for presentation to other UDs 104 during UCWP. For example, UCWPC segments containing abusive, offensive, pornographic, suggestive, violent, fakes, or other types of content may be identified by the server conference engine 119 (alone and/or in conjunction with UD conference engines 306) as being inappropriate and not provided to one or more UDs 104. For further example, UDs associated with a child may be precluded from receiving certain UCWPC segments, while UDs associated with an adult may not be so precluded.

For an implementation, the server conference engine 119 (alone and/or in conjunction with UD conference engines 306) modifies or otherwise adjusts one or more aspects of a given user data 138 and/or of a given background data 140 based upon any parameter or condition. For example, a user using a CCD 134 to capture their image while they travel about their house may desire for background images depicting their home and its contents not be provided to other UDs 104 during a UCWP. Essentially, a "green screen" or the like may be virtually provided by the server conference engine 119 (alone, by and/or in conjunction with UD conference engines 306) such that any such background images are replaced by another background image—such as a static background image. For an implementation, background data 140 may be replaced with one or more UCPC segments, including UCPC segments containing motion video or static images. For another implementation, a server conference engine 119 (alone and/or in conjunction with UD conference engines 306) may modify one or more aspects of a background data 140 and a user data 138 in relation thereto. For example, a given user's image may be superimposed on a given background image.

For an implementation, the server conference engine 119 (alone and/or in conjunction with UD conference engines 306) utilizes artificial intelligence and/or machine learning, e.g., in conjunction with user data, to identify and/or prioritize user data 138, background data 140 and/or other UCWPC to be provided to other UDs 104 during a UCWP. For example, an image of a coach, may be prioritized for providing to other UDs 104 over an image of a bench warmer, a retired participant, a fan, and/or a non-participant in a given sporting event being presented in one or more UCPC segments during a UCWP.

Server User Choice Engine 120

For an implementation of the present disclosure and to facilitate the selection of UCPC segments during a UCWP, a server user choice engine ("SUCE") 120 may be instantiated on the sync server 102, with a corresponding device user engine ("DUCE") 305 being instantiated on the UDs 104 participating in a given UCWP. The SUCE 120 may be configured to coordinate selection of UCPCs with two or more DUCEs 305. Coordination and presentation of UCWPC during UCWP may occur by the server sync engine 118 and/or the server conference engine 119 and further alone and/or in conjunction UD sync engines 304 and UD conference engines 306. Such coordination may occur with any given level of synchronization. As discussed herein, the level of synchronization may vary by UD, over time, by UCPC selected, based upon various CTIs, and otherwise.

Operations performed by a SUCE 120 (alone and/or in conjunction with operations performed by one or more DUCEs 305) may be initiated when a UCWP is initiated (as shown per Operation 400(A)). Operations by the SUCE 120 (alone and/or in conjunction with operations performed by one or more DUCEs 305) may occur separately and/or in parallel with operations performed by other server and/or UD engines during a UCWP—such as those identified in the non-limiting operations shown per FIGS. 4A and 4B and otherwise described herein.

As shown in FIG. 5, and per Operation 500, a UCWP may be initiated (when selected, as per Operation 401). For at least one implementation, one or more of the Operations shown in FIG. 5 may occur at any time before or during a given UCWP.

As shown per Operation 502, the process may include the SUCE 120 (alone and/or in conjunction with a DUCE 305) receiving a request to designate a UD 104 as a user choice user device ("UCUD"). A UCUD is a user device that is permitted by a HUD 104-H to participate in a selection of one or more UCPCs during a UCWP. In at least one implementation, a UCUD may be given selection rights that the SUCE 120 considers in identifying which UCPC segment(s) to present to UDs during a UCWP. For at least one implementation, different UDs 104 may be designated as a UCUDs during a UCWP and multiple UDs 104 may be designated as UCUDs, at any given time, during a UCWP. The SUCE 120 may receive (from one or more DUCEs 305) requests for a given UD 104 to be designated as a UCUD at any given time. For an implementation, such requests may be communicated using the sync links 110 and the server sync engine 118 and corresponding UD sync engine(s) 304 on the one or more requesting UDs 104. The requesting UD(s) 104 may be HUDs 104-H and/or CUDs 104-C. It is to be appreciated that a request for a UD 104 to be designated as a UCUD may occur at any time during a UCWP and/or a Party.

As shown per Operation 504, the process may include the SUCE 120 denying the request to designate a given UD 104 as a UCUD. When the request is denied and no other UDs 104 have been designated as a UCUD, the UCWP may terminate and the process may continue with one or more WP operations (as provided, for example, per FIGS. 4A and 4B).

As shown per Operation 506, the process may include the SUCE 120 (in conjunction with a respective DUCE 305 designating a given UD 104 as a "primary UCUD" ("PUCUD"). As used herein, the PUCUD may have veto or override authority for choices otherwise made by other UCUDs for a given UCWP. For at least one implementation, a HUD 104-H for a given WP may be designated, by default, as the PUCUD for a UCWP. The process may then proceed in parallel with determining whether other UDs 104 are to participate as "secondary UCUDs" ("SUCUD"), as per Operations 508 and 510. The PUCUD may specify one or more rules regarding how one or more SUCUDs may vote on UCPC to be presented during a UCWP. The PUCUD may require one or more commitments from SUCUDs to participate in a given UCWP even when a first choice by a given SUCUD is not the overall vote winner and is not presented during a given UCWP.

As shown per Operation 508, the process may include the SUCE 120 (in conjunction with one or more other DUCEs 305) querying one or more second UDs 104 participating in a given UCWP whether the one or more second UDs 104 is to participate as a SUCUD during the UCWP. The process may repeat until at least two UDs agree to participate as UCUDs. If two UDs do not agree to participate as UCUDs, the process may resume at Operation 504 and with a conventional (non-UCWP) watch party where the primary content is selected by the HUD 104-H.

For at least one implementation of a UCWP, at least two UDs 104 are designated as UCUDs for a given UCWP. For at least one implementation, any number between two and all UDs 104 participating in a given UCWP may be designated as UCUDs.

For at least one implementation, UDs 104 associated with users satisfying one or more criteria may be solicited for participation in a UCWP as a UCUD. Such criteria may be verified using user data 204 provided in a server data store 204 and/or user data 312 provided in a UD data store 310.

As shown per Operation 510, the process may include the SUCE 120 designating as UCUD(s) the one or more second UDs 104 agreeing to participate as a UCUD, per Operation 508. Such designation may occur by the SUCE 120 alone and/or in cooperation with their respective DUCEs 305. When at least two UCUDs have been designated, the process may then proceed to Operation 512.

As shown per Operation 512, the process may include the SUCE 120 (alone and/or in combination with the DUCEs 305 in the designated two or more UCUDs) generating and outputting a user choice interface ("UCI"). The UCI may be presented to a user in one or more humanly perceptible formats, such as audibly, visually, or otherwise. The UCI may be shown in a window on a personal computer, in an application of a smartphone or similar device, as an overlay on a watch party display, or otherwise. In at least one implementation, the UCI may be presented as a sequence of one or more audibly selectable choices, as may occur using an interactive voice response system or the like. Content presented by the UCI may be designated by the SUCE 120 and provided by one or more content providers 105.

As shown per Operation 514, the process may include the SUCE 120 instructing the DUCEs 305 to retrieve two or more UCPC options from one or more data stores and/or from one or more content providers 105. The UCPC options may include one or more UCPC segments, secondary content regarding a given UCPC option, such as a movie poster, a movie or video trailer, an audio soundtrack portion, descriptive information regarding a primary content, ratings, or the like. The content presented in the UCI may be of any length, type, format, or otherwise. For at least one implementation and with respect to the UCPC options, the PUCUD may specify one or more UCPC option settings, such as UCPC length, language, format, genres, purchase restrictions, such as free, under a certain amount, or otherwise, whether a UCPC option is a new release or the like, a number of UCPC options to be presented for voting upon by the PUCUD and SUCUDs, and other UCPC option settings.

For at least one implementation, the SUCE 120 may search one or more content databases for UCPC matching one or more criteria. The criteria may be selected by the SUCE 120 based upon user data, such as prior viewing histories for two or more UDs 104 participating in the given UCWP, based upon inputs received from one or more DUCEs 305 or otherwise.

For at least one implementation, the SUCE 120 may identify UCPC options that are compliant with content access rights for the UDs 104 that will be participating and/or are participating in the UCWP. The SUCE 120 may filter UCPC options based on digital rights management (DRM) rights associated UCPC and with the participating UDs 104. Such DRM rights may be obtained from the participating the server data store 204, user device data stores 310, content providers 105, content sources 107, or other sources of DRM rights. The DRM rights may be obtained by one or more participating UDs 104 before and/or during a given UCWP.

As shown per Operation 516, the process may include the SUCE 120 instructing the DUCEs 305 to present, using the UCI, the two or more UCPC options retrieved per Operation 514. For at least one implementation, the two or more UCPC options may be presented as trailers in a window, overlay, or the like on the UCI. The trailers may be provided in any humanly perceptible format such as a video segment, a still image, an audio clip, a title, descriptive text, or otherwise. The SUCE 120 may instruct the DUCEs 305 when, how, format, length and the like for the presenting of the UCPC options on the UCI. For at least one implementation, the SUCE 120 may control, via the DUCE(s) 305, the presenting of UCPC options on the UCI such that a uniform presentation is provided across the two or more UCUDs participating in a given UCWP.

As shown per Operations 518 and 520, the process may include the SUCE 120, in cooperation with the DUCEs 305, determining whether user choices have been received from each of the primary through Nth UCUDs. The user choices may include a selection of at one of the two or more UCPC options presented, a ranking, ordering, sequencing or other arrangement of the two or more UCPC options presented on the UCI, a recommendation of different UCPC options to be presented, or the like. For at least one implementation, the SUCE 120 may monitor use inputs to determine whether an input has been received from each of the UCUDs.

As shown per Operations 517 and 519, the process may include the SUCE 120, via the two or more DUCEs 305, monitoring user reactions to the UCPC options. The process may further include the SUCE 120 tallying results/user inputs from the PUCUD and the SUCUDs, as communicated by the respective DUCEs 305 to the SUCE 120. The DUCEs 305 in the primary and SUCUDs may be configured to utilize one or more CCDs 134 in monitoring user reactions to UCPC options.

For at least one implementation, one or more user reactions to segments of one or more UCPC options may be presented in the UCI. For at least one implementation, rankings of a UCPC option, relative to other UCPC options and for a given primary and/or SUCUD, may be automatically generated based upon a reaction by one or more users of a given UCUD during a presentation of the two or more UCPC options. Such reactions may include audible, visible, and other reactions.

For at least one implementation, reactions may be tallied using a ROTTEN TOMATOES scoring technique, a weighted scoring technique, or other scoring technique.

As shown per Operation 522, the process may include the SUCE 120 determining whether a period for receiving user inputs, in response to the presenting of two or more UCPC options, has occurred. If "no," the process may resume with Operation 518. If "yes," the process may continue with Operation 524.

As shown per Operation 524, the process may include the SUCE 120 determining selection results from the two or more user choices. For at least one implementation, such determining may utilize results tallied per Operation 519. The determining may occur in view of any tallied results, additional factors, if any, or otherwise. For at least one implementation, a UCPC option receiving the most votes may be selected as the UCPC to present during the UCWP. For an implementation, a UCPC option receiving a plurality of votes may be selected as the UCPC to present during the UCWP. For an implementation, a UCPC option receiving a minimum number of votes from secondary UCDCs, as well as a vote from the primary UCDC, may be selected as the UCPC to be presented during the UCWP. For an implementation, a UCPC option having a highest result in two or more criteria may be selected as the UCP to be presented during the UCWP. The two or more criteria may include any combination and/or permutation of criteria, such as votes received, length, payment status, genre, age classifications, such as those by the Motion Pictures Association of America (MPAA), or otherwise.

As shown per Operation 526, the process may include the SUCE 120 instructing each DUCE 305 to retrieve from a content provider or other data source and present the chosen UCPC option. The presentation of the chosen UCPC during a UCWP may proceed in accordance with any other form of watch party including, but not limited to, those described in the cross-related applications identified herein.

As shown per Operation 528, the process may include the SUCE 120, during the presenting of the chosen UCPC, receiving, storing, monitoring, presenting in the UCI, and otherwise processing reactions, as captured by CCDs coupled to the respective PUCUDs and SUCUDs. For at least one implementation, such reactions may be communicated to the SUCE 120 by the respective DUCEs 305.

As shown per Operation 530, the process may include the SUCE 120 classifying and/or otherwise categorizing and organizing the reactions. For at least one implementation, the SUCE 120 may utilize the reactions for later identification of UCPC options for later arising UCWPs. Using machine learning processes, the SUCE 120 may be configured to determine for future UCWPs which UCPC options to present to a group UDs 104 based upon reactions to previously chosen UCPC option(s). Accordingly, it is to be appreciated that the process may include the SUCE 120 refining selection and presentation of UCPC options based upon past reactions to previously presented UCPC.

As shown per Operation 532, the process may include the SUCE 120 analyzing current reactions to generate an engagement score for the chosen UCPC option. The engagement score may indicate acceptance, rejection, like/dislike or other positive, neutral, or negative reactions by a given user and/or for a collection of participating UDs 104, to the chosen UCPC option. For at least one implementation, the engagement score may use a scale ranging from zero (0) to ten (10), with a score of five (5) indicating approval of the chosen UCPC option by at least half of the SUCUDs participating in the UCWP and a score of ten (10) indicating approval by all of the SUCUDs participating in the UCWP. For other implementations, other forms of engagement scores may be used, including scores for various aspects of a given UCPC, such as action, dialog, plot, character development, drama, scariness, or the like. For at least one implementation, an engagement score may be generated based on multiple aspects, with CCDs, chat dialogs, audio dialogs, or other indicators being used to measure and capture a given user's explicit or implicit scoring of the various aspects of a given UCPC. For example, a user repeating dialog from a given UCPC may be indicative of a higher rating for the dialog aspect for the given UCPC.

The SUCE 120 may be configured to generate the engagement score as one score for an entirety of an UCPC option, as multiple scores, with each score corresponding to a UCPC segment, as a running tally, or otherwise. When the engagement score falls below a given threshold, or otherwise indicates that the UCWP may no longer be favorably received by one or more UDs 104 participating in the UCWP, the process may include Operation 533, otherwise the process proceeds to Operation 534.

As shown per Operation 533, the process may include the SUCE 120 determining whether to present new UCPC options during a given UCWP. If "yes," the process may proceed to Operation 514 and the retrieval of one or more UCPC options. If "no," the process may proceed to Operation 534. In performing Operation 533, the SUCE 120 may solicit and receive feedback from one or more DUCEs 305; such feedback indicating whether the current UCPC option should continue to be presented or whether new UCPC options should be presented, as per Operation 514.

As shown per Operation 534, the process may include the SUCE 120 determining whether time allotted for the UCWP has expired or whether the UCWP should otherwise be terminated. A given UCWP may be designated for a given time period, for an indefinite period, or otherwise. A given UCWP may be determined to end based upon engagement level by participating UDs 104, a number of UDs 104 still participating in the UCWP, instructions to end the UCWP as specified by the PUCUD, or otherwise.

As shown per Operation 536, the SUCE 120 terminates the UCWP. Upon termination of the UCWP, post-event processing operations described herein and/or as otherwise described in one or more of the related applications identified herein may be performed.

It is to be appreciated that the operations depicted in FIG. 5 are illustrative and are not intended herein to occur, for implementations of the present disclosure, in the order shown, in serial, or otherwise. One or more operations may be performed in parallel and operations may be not performed, as provided for a given responder. For example, a responder may be recalled back to their station even while an incident is on-going for rest, recovery, availability for other incidents, or otherwise.

Server Data Store 204

The server data store 204 may be a storage, multiple storages, or otherwise. The server data store 204 may be configured to store user data 204A, sync data 204B, conference data 204C, UCWP content data 204D, voting models data 204E, and other data. The server data store 204 may be provided locally with the sync server 102 or remotely, such as by a data storage service provided on the Cloud, and/or otherwise. Storage of data, including but not limited to user data 204A, sync data 204B, conference data 204C, UCWP data 204D, voting models data 204E, and other data may be managed by a storage controller (not shown) or similar component. It is to be appreciated such storage controller manages the storing of data and may be instantiated in one or more of the server store 204, the server CPU 202, on the Cloud, or otherwise. Any known or later arising storage technologies may be utilized in conjunction with an implementation of the present disclosure to facilitate the server data store 204.

Any known or later arising storage technologies may be utilized for the server data store 204. Non-limiting examples of devices that may be configured for use as server data store 204 include electrical storages, such as EEPROMs, random access memory (RAM), Flash drives, and solid-state drives, optical drives such as DVDs and CDs, magnetic storages, such as hard drive discs, magnetic drives, magnetic tapes, memory cards, such as Compact Flash (CF), Secure Digital (SD) cards, Universal Serial Bus (USB) cards, and others.

Available storage provided by the server data store 204 may be partitioned or otherwise designated by the storage controller as providing for permanent storage and temporary storage. Non-transient data, computer instructions, or other the like may be suitably stored in the server data store 204. As used herein, permanent storage is distinguished from temporary storage, with the latter providing a location for temporarily storing data, variables, or other instructions used for a then arising data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store transient and non-transient computer instructions, and other data.

UCWP content data 204D may include segments of UCWP content that corresponds to a given primary content. One or more UCWP content segments may be stored on the sync server 102, one or more UDs 104, and/or the Cloud. For at least one implementation, a content link 114 may be used to provide UCWP content data 204D to the sync server 102 from a content node 106.

Voting models data 204E may include models of one or more users providing one or more choses during a UCWP. Such voting models may be generated using any known or later arising modeling programs.

A sync server 102 may include information identifying segments of content that are stored on one more UDs 104. Such content segments are referred to herein as "pre-cached content." Non-limiting examples of pre-cached content may include commercials, segments of non-live programs, trailers, or otherwise. Pre-cached content may be used by a sync server 102 to facilitate a UCWP by providing ready access to the UCPC, by a given UD 104, when a given content link 114 is unreliable, of insufficient bandwidth, experiences undesirable latency, or otherwise. A sync server 102 may instruct a given UD 104 to access such pre-cached content on an on-demand or otherwise basis. Such instructions may be provided, for at least one implementation, over one or more of the sync link 110 and/or the content link 114.

Server Power Supply 206

The sync server 102 may include a server power supply 206. The server power supply 206 may include any known or later arising technologies which facilitate the use of electrical energy by a sync server 102. Non-limiting examples of such technologies include batteries, power converters, inductive charging components, line-power components, solar power components, and otherwise.

Server Security 208

The sync server 102 may include a server security 208. The server security 208 may include any known or later arising security hardware components and/or computer instructions configured for use to secure content, communications regarding such content, server processes and data, and otherwise. Security components may be used to facilitate secure transmission, processing, storage and otherwise of any data used in accordance with an implementation of the present disclosure.

Server Communications Interface 210

The sync server 102 may include a server communications interface 210. The server communications interface 210 may be configured to use any known or later arising communications and/or networking technologies which facilitate use of the communications network 109 (as further described herein). Communication interfaces are well-known in the art and non-limiting examples include Ethernet cards, USB and storage medium interface cards, radio frequency transceivers, and others.

Server User Interface 212

The sync server 102 may include a server user interface 212. The server user interface 212 may include any known or later arising human to device interface components, processes, and technologies. Non-limiting examples of interface components include devices configured for use with audible inputs (such as spoken commands) and audible outputs (generated sound), visible inputs (such as CCD captured data) and visible outputs (such as data provided for presentation on a display device), and otherwise. The server user interface 212 may be coupled to and/or include the one or more presentation devices (not shown). The presentation devices facilitate interactions between an operator and the sync server 102.

Content Providers 105, Content Nodes 106 and Content Sources 107

For at least one implementation, the system 100 may include one or more content nodes 106. Content nodes 106 may be provided individually and/or collectively with a content provider 105 and/or one or more content sources 107. Non-limiting examples of content providers 105 include SLING TV, NETFLIX, AMAZON PRIME, and others. Content providers 105 commonly receive primary content 108 from content sources 107. Non-limiting examples of content sources 107 include television networks, such as ABC, NBC and the like, pay-per-view transmission, online channels, and otherwise. A content provider 105 and a content source 107 may be provided in combination or separately. Content sources 107 may be communicatively coupled to one or more content providers 105 which provide content to UDs 104 via one or more content nodes 106. One or more of the content providers 105, content nodes 106 and/or content sources 107 may be similarly configured to the sync server 102 and include one or more processors, data storage components, user interface components, security components, communications, and other components. The characteristics and capabilities of such components are well known in the art and one or more of such components may be configured to execute computer instructions which facilitate UCWPs. A content provider 105 and/or one or more content nodes 106 may include use of a content distribution network.

Network 109

A network 109 communicatively couples the various system 100 elements. The network 109 may utilize any known and/or later arising communications and/or networking technologies, standards, protocols or otherwise. Non-limiting examples of such technologies include packet switch and circuit switched communications technologies, such as and without limitation, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, Internet of Things (IoT) networks, Cloud based networks, private networks, public networks, or otherwise. One or more communications and networking standards and/or protocols may be used including, without limitation, the TCP/IP suite of protocols, the Extensible Message and Presence Protocol (XMPP), VOIP, Ethernet, Wi-Fi, CDMA, GSM/GRPS, TDMA/EDGE, EV/DO, WiMAX, SDR, LTE, MPEG, and others.

The network 109 may include physical data processing and communication components. The network 109 may be physically and/or virtually instantiated. Non-limiting examples of physical network components include data processing and communications components including computer servers, blade servers, switches, routers, encryption components. decryption components, and other data security components, data storage and warehousing components, and otherwise. Any known or later arising physical and/or virtual data processing and/or communications components may be utilized.

As shown in FIG. 1, one or more communications links may be established between one or more of a sync server 102, a UD 104, and a content node 106. A number of such communications links, including the communications links, may be combined or provided as multiple, or other combinations of communication links. Accordingly, it is to be appreciated that the communications links are described herein for purposes of functional explanation and are not limited to any particular physical, virtual, or other configurations.

More specifically, a sync link 110 may be established between a sync server 102 and a UD 104. The sync link 110 may be used to facilitate communication of timing, status, and other synchronization information by and between a given UD 104 and the sync server 102.

As further shown in FIG. 1, a conference link 112 may be established between a sync server 102 and a UD 104. The conference link 112 facilitates bi-directional communication of one or more users' reactions to a given content during a UCWP and reactions captured by a given UD may be shared during a UCWP. Reactions may be communicated to the sync server 102 using the conference link 112 and redistributed to the other users using respective other conference links 112 established therebetween. For example, audio and/or video of a user's reaction may be communicated over respective conference links 112 to other users while content information is communicated over respective content links 114 such that, as combined, information may be presented using an output device in a picture-in-picture, overlay, separate audio channel, mixed audio channel, text message stream, closed captioning stream, or otherwise to users showing UCPC. Reactions may be communicated using the system 100 in separate data streams, such as separate MPEG, AAC, or other audio and/or video streams. A UD 104 and/or the sync server 102 may be configured to mix, present, or otherwise process reactions in accordance with preferences of a given user, based upon a default setting, or otherwise.

As further shown FIG. 1, a content link 114 may be established between a sync server 102 and a UD 104. A content link 114 facilitates communication of content by a content node 106 to a UD 104. While depicted in FIG. 1 as a unidirectional link, it is to be appreciated that a content link 114 may be bi-directional, or otherwise.

The sync links 110, conference links 112 and content links 114 may utilize any known or later arising communications technologies, with non-limiting examples including communication links provided by wired connections, wireless connections including micro-wave, 3G/4G/5G, WIFI, BLUETOOTH, and other types, satellite connections, fiber optic connections, and otherwise.

One or more of the sync server 102, a transmitting UD 104 and/or a receiving UD 104 may be configured to transform reactions provided by a given user into an audible, visual, grammatical, phonetic, language, or other format selected by another user. For example, reactions in the Spanish language may be translated into the English language. Similarly, reactions may be converted to text for hearing impaired users and physical reactions (such as clapping or the like) may be converted to descriptive text for visually impaired users. Other reactions may be converted for any given implementation. For at least one implementation, Cloud based resources may be used for reaction conversions.

UDs 104

As shown in FIG. 3, a schematic illustration of a UD 104 for facilitating UCWPs, in accordance with at least one implementation of the present disclosure, may include a CPU 302, a data store 310, a power supply 332, a security 334, a communications interface 336, and a UD user interface 324. The user interface may further include a view engine 326, and a multiplexer ("mux") 328. A UD 104 may include an internal display 330 and may be coupled to an external display 130 (as shown in FIG. 1).

As discussed above, the system 100 includes two or more UDs 104 including a HUD 104-H and one or more CUDs 104-C. The UDs 104 may be similarly configured or may be differently configured, for a given implementation. Known and/or later arising device capable of receiving and presenting content to a user while facilitating collaboration during a UCWP may be used. Non-limiting examples of UDs 104 include smartphones, laptop computers, tablet computing devices, desktop computers, smart televisions, smart glasses, virtual reality glasses, augmented reality glasses, earbuds/headphones and other audible output devices, and other devices. UDs 104 may be communicatively coupled to one or more of the content providers 105, content nodes 106, content sources 107, and/or sync servers 102 using any known or later arising communications and/or networking technologies including, but not limited to, cable systems, satellite systems, streaming audio and video systems, online gaming systems, and/or other content distribution systems, on-line content distribution systems, combinations thereof, and the like.

UD CPU 302

As shown in FIG. 3, a UD 104 may be configured to include a UD CPU 302. The UD CPU 302 may be configured similarly to and/or have less, the same, or more of the capabilities of the server CPU 202, as described above. For purposes of conciseness, such capabilities are not repeated here. Any know or later arising data processing and other CPU technologies may be used as the UD CPU 302. The UD CPU 302 may be communicatively coupled, by a UD data bus 327 or similar structure, to other components of the UD 104 including, but not limited to, a UD data store 310, which may also be referred to as a "computer readable storage medium."

UD Sync Engine 304

For at least one implementation, a UD sync engine 304 may be configured to manage synchronization of content during a live and/or recorded UCWP and while such content is provided separately by one or more CCDs 134 to a UD 104. Status information regarding the communication of content from a CCD 134 to a UD 104 may be provided by the CCD 134.

A UD sync engine 304 may be configured to cooperate with the server sync engine 118 to facilitate UCWPs. The UD sync engine 304 may facilitate synchronization of primary content during a UCWP by accepting a designation of a given UD 104 as a PUCUD, a SUCUD, or a participating UD. A UD sync engine 304 may be configured to limit a UD's 104 capabilities and functions during a UCWP. For example, a given UD 104 associated with a parent of a household may be configured to function as a PUCUD or a SUCUD, while a given UD associated with a child in that household may be configured to function solely as a participating UD.

A UD sync engine 304 may be configured such that upon initiating a UCWP that UD is automatically, manually, or otherwise designated as a PUCUD, SUCUD or a participating UD for the given UCWP. A UD sync engine 304 may be configured such that a given UD 104 participating in a given UCWP may be designated as a PUCUD, SUCUD, or participating UD at any time during the UCWP. Such designation(s) may occur, for example, when a secondary UD seeks to seize control of the UCWP, by becoming a PUCUD, for any or no reason. For example, a parent may seek to seize control of a UCWP and become the PUCUD when the UCPC and/or collaboration occurring during the UCWP includes inappropriate content.

A UD sync engine 304 for a PUCUD may be configured to designate another UD, such as a CUD 104-C, as the PUCUD at any time, for example, when a prior host is no longer participating in a given UCWP, or as otherwise needed.

Commonly, one UD 104 is designated as the PUCUD at any given time during a UCWP, with other UDs being designated as SUCUDs and/or participating UDs. A UD sync engine 304 in a PUCUD, SUCUD or participating UD 104 may be configured to reflect the then occurring status of a given UD 104.

A UD sync engine 304 may be configured to synchronize a presentation of content, on one or more UDs 104 by providing CTIs to the server sync engine 118. CTIs may be provided to the server sync engine 118 by a UD sync engine 304 executing on the designated UD 104. CTIs may be provided to the server sync engine 118 and CUDs 104-C by the UD sync engine 304 executing on a designated HUD 104-H. CTIs may be provided to the server sync engine 118 by corresponding UD sync engines 304 executing on the HUDs 104-H and CUDs 104-C. Content timing information may be provided by a given UD 104 to the sync server 102 and/or any other UD 104 participating in a given UCWP on any basis, periodicity, or otherwise.

For at least one implementation, a sync engine 304 may be configured to periodically receive content timing information for the PUCUD, which may be a HUD 104-H or a CUD 104-C, from the sync server 102.

For at least one implementation, a UD sync engine 304 may be configured to facilitate use of one or more trick-play modes during a UCWP. Trick-play modes, when supported for a given content, may be requested, via the UD sync engine 304, by a CUD 104-C for approval of and selected by the HUD 104-H. A trick-play mode selected by the HUD 104-H may be communicated by a UD sync engine 304 executing thereon and to the server sync engine 118, and further communicated to a UD sync engine 304 executing on a CUD 104-C participating in the given UCWP.

A communication of a selected trick-play mode by a HUD 104-H to the server sync engine 118 and thereon to a CUD 104-C may include CTIs specifying a start location for the selected trick-play mode, an identification of the type of trick-play mode selected, and (where appropriate) an end UTC location specifying where normal play mode is to resume, and/or other information useful in facilitating implementation of the selected trick-play mode by the CUD 104-C participating in the given UCWP.

The UD sync engine 304 may be configured to capture the information needed to facilitate trick-play modes across one or more CUDs 104-C participating in a given UCWP. A trick play mode may be applied, in synchronization, with any content which has been presented to a UD 104 at substantially the same time, as designated, for example, by a UTC location. For at least one implementation of a UCWP, one of either a HUD 104-H or a CUD 104-C may be configured as a PUCUD, and any remaining UDs participating in the UCWP may be configured as a SUCUD or as a participating UD.

A UD sync engine 304 on a CUD 104-C may be configured to modify trick-play instructions, as received from a HUD 104-H and via the sync server 102. Such modified trick-play instructions may be specific to the given CUD 104-C. It is to be appreciated that modifications of trick-play instructions, may be in view of and/or based upon client CTIs generated by the given CUD 104-C. Such client CTIs may be indicative of synchronization issues a given CUD has been experiencing during a given UCWP, such as repeatedly receiving a given content at a faster or slower rate than occurs with respect to the HUD 104-H and adjustments made by the UD sync engine 304 independently or based upon adjustment instructions received from the server sync engine 118.

A given sync engine 304 may be configured such that a given content segment, as communicated to the given CUD 104-C, occurs such that any latency, delays, and/or other issues arising with the communication, processing, and/or presenting of a given portion of a content segment by the given CUD 104-C are addressed (if addressable) such that the presentation of future arising content segments by that CUD 104-C occurs substantially simultaneously with the presentation of content segments by the HUD 104-H. The server sync engine 118 may be configured to facilitate synchronization of content segments by a UD sync engine 304 such that presentation of future content occurs substantially simultaneously across two or more UDs participating in a given UCWP.

A UD sync engine 304 may be configured such that adjustments to presentations of content by a CUD 104-C, in view of CTIs provided by the HUD 104-H, occurs such that the presentation of such content by the CUD 104-C is at one or more of a quality setting, a minimum quality setting, a maximum quality setting, or otherwise.

When a specified quality setting is not achievable, at a given time and/or over a given period, by a given CUD 104-C, the UD sync engine 304 for such CUD 104-C may take corrective actions until such quality settings can be realized thereby. Non-limiting examples of such corrective actions include: pausing, fast forwarding, slowing down, or otherwise modifying how content is provided to and/or presented by a given CUD 104-C during a UCWP.

A UD sync engine 304 may be configured to utilize sync data 314 including, but not limited to, CTIs including, but not limited to, fast-play, slow-play and other sync options, provided by one or more UDs 104. Sync data 314 may include a subset of, additional, different, or the same data and/or computer instructions used to facilitate synchronization of content presentation during a UCWP. Non-limiting examples of sync data 314 include communications sockets used by UDs 104 to connect with a content provider 105 and/or a content node 106, IP addresses for UDs 104, UD identifiers, such as MAC addresses, communications network settings used for one or more of the content links 114 or sync links 110, available buffer and/or storage on a UD 104, and otherwise.

A UD sync engine 304 may utilize user data 312 to a facilitate synchronization of UCPC during a UCWP. User data 312 may include a subset of, additional, different, or the same data and/or computer instructions used to facilitate synchronization of primary content presentation during a UCWP, as provided in the user data 204A. Non-limiting examples of user data 312 include user demographic information, UD information such as capabilities, technologies supported, and the like, user preferences, user viewing histories, and the like.

Device User Choice Engine ("DUCE") 305

A DUCE 305 may be configured to perform and/or facilitate the performing by the sync server 102, the SUCE 120, and/or other engines of one or more UCWP Operations, as described above with respect to FIG. 5. Such Operations are not repeated herein, any of such Operations may be performed by a DUCE 305 alone and/or in conjunction with the sync server 102 and/or other UDs.

Conference Engine 306

A conference engine 306 may be configured to facilitate collaboration by and between users, via their respective UDs 104, during a UCWP, and using the two or more conference links 112 established with the sync server 102.

Synchronization of and collaboration by and between users (via their respective UDs 104) during a given UCWP may be decoupled from one or more of a providing of content (by the content nodes 106 to the UDs 104) and/or any synchronization of content presentation, as facilitated by the UD conference engine 306 in cooperation with the server conference engine 119. A UD conference engine 306 may be configured to provide reactions of a given user with the sync server 102 independently of other UCWP elements.

A UD conference engine 306 may be configured to support collaboration between users in any humanly perceptible format; non-limiting examples including speech, video, text, emoticons, gestures, or otherwise. The conference links 112 and collaborative aspects of a UCWP may be established or unestablished at any time. A UD conference engine 306 may be configured to leverage proprietary, custom, open source, or otherwise provided conferencing software applications including, but not limited to, JITSI MEET, WEBEX, ZOOM, and otherwise.

A UD conference engine 306 may be configured to utilize conference data 316. Conference data 316 may a subset of, additional, different, or the same data and/or computer instructions used to facilitate synchronization of content presentation during a UCWP as provided by conference data 204C. Conference data 316 may include any data and/or computer instructions which facilitate collaboration during a UCWP. Non-limiting examples of Conference data 316 include communications sockets used by UDs, IP addresses for UDs, UD identifiers, such as MAC addresses, communications network settings used for one or more conference links 112 and otherwise. A UD conference engine 306 may be configured to utilize user data 312 to a facilitate collaboration during a UCWP.

Conference data 316 may be stored in the UD data store 310 and used by the UD conference engine 306 in facilitating collaboration during a UCWP. Non-limiting examples of conference data 316 include type of connection, distance of a UD 104 from a sync server 102, maximum available bandwidth for a given conference link 112, throughput for the conference link 112, latency, and other data. UD conference data 316 may be provided for one or more conference links 112 used during a UCWP.

A UD conference engine 306 may be configured to facilitate any singular or combination of voice, video, web, or other conferencing activities including, but not limited to, chat, private rooms, polling, voting, verbal reactions, visible reactions, emoticons, or the like. A UD conference engine 306 may facilitate user-to-user (or private) communications, user-to-multiple user (or semi-private) communications, user-to-all (or public) communications, or otherwise during a UCWP.

A UD conference engine 306 may be configured to store user communications during a given UCWP in the UD data store 310 as UD conference data 316. UD conference data 316 may be time stamped and/or otherwise synchronized with respect to a given content segment such that a later playback of the conference data and/or the given content segment may include the conference data corresponding to such given content segment, as such conference data was generated during the given UCWP. For example, a later viewing of the football program, the primary content, by a user of the given UD 104 may include a presentation of the UD conference data 316 arising during the original UCWP. Synchronization and presentation information provided by UD conference data 316 may enable the user of the given client UD to later enjoy the original UCWP as if participating real-time even when such UCWP may in fact have occurred earlier. Such example may also be extended to other forms of Parties.

Primary Content Engine 308

The UD may also be configured to include one or more "engines" (as described above) including a primary content engine 308. The primary content engine 308 may be configured to support the features and functions of the server sync engine 118 and the server conference engine 119 in facilitating the synchronization of primary content, including UCPC, and of collaboration across UDs 104 participating in a UCWP.

A primary content engine 308 may be configured to facilitate such substantially simultaneous presentation of a given primary content segment by adaptively modifying one or more of the resolution, bit rate, content size, communications bandwidth utilized, communications link type used between a content node 106 and a given UD 104, or otherwise. The primary content engine 308 may be configured to retrieve and synchronize presentation of primary content, including UCPC, on a given UD 104 in order to facilitate a UCWP. A primary content engine 308 may communicate status information over a content link 114 to a content node 106.

For at least one implementation, ABR streaming sessions may be used between a given content node 106 and a given UD 104 to facilitate substantially simultaneous presentation of primary content, including UCPC, during a UCWP. One or more adaptive bitrate streaming technologies may be utilized by a content node 106 and a communicatively coupled thereto primary content engine 308 executing on a given UD 104. Non-limiting examples of ABR streaming technologies that may be utilized include MPEG-DASH, Adobe Systems HTTP Dynamic Streaming, Apple HTTP Live Streaming, Microsoft Smooth Streaming, and others. It is to be appreciated that by adaptively modifying the bitrate used to provide primary content to a given UD 104 and to multiple UDs 104 during a UCWP, content segments may be respectively and substantially simultaneously communicated, received, decoded, and presented on the UDs 104 participating in a UCWP.

For example, for a host UD 104-H communicatively coupled to a host content node 106-H using a 100 Mb/s connection, the host content node 106-H and/or a first host content link 114-H may be configured to provide a given content segment at a 4 K resolution. For a CUD 104-C communicatively coupled to a client content node 106-C using a 15 Mb/s connection, the client content node 106-C and/or the client content link 114-C may be configured to provide the given content segment at a 720p resolution to the CUD 104-C. By providing the given content segment at the lower resolution it is to be appreciated that the reception and presentation of such content segment may occur substantially simultaneously (assuming UD content processing times are equal) on the HUD 104-H and the CUD 104-C.

Further, given that processing times for UDs 104 for given content segments may vary, a primary content engine 308 may be used in conjunction with a UD sync engine 304 to determine one or more transmission and/or processing characteristics (herein "transmission characteristics"), such as bandwidth, latency, resolution, processing speed, packet size, and others. Transmission characteristics may vary over time, by UD 104, and otherwise. Transmission characteristics may be suitably stored as content data 318 and in a UD data store 310. User data 218A may also be accessed by the primary content engine 308 in determining one or more characteristics of content information to be received from a given content source for a given UD.

UCWP Content Engine 309

For at least one implementation, a UCWP content engine 309 may be configured to facilitate such substantially simultaneous presentation of a given UCPC content segment by adaptively modifying one or more of the resolution, bit rate, content size, communications bandwidth utilized, communications link type used between a CCD 134, a given UD 104, and a sync server 102.

A UCWP content engine 309 may be configured to retrieve and synchronize presentation of UCPC on a given UD 104 in order to facilitate a UCWP. A UCWP content engine 309 may be configured to communicate status information for content over the sync link 110-H to the sync server 102. Based on such status information, the sync server 102 may coordinate the providing of content to other UDs 104 participating in a given UCWP.

Further, given that processing times may vary for UDs 104 and for a given content segment, a UCWP content engine 309 may be used in conjunction with a UD sync engine 304 and other engines to determine one or more characteristics of a given CCD link 136, via which a given UD 104 receives user data 138 and/or background data 140 from a CCD 134, and one or more characteristics of a given sync link 110 and/or a given conference link 112, via which the given UD 104 communicates the as received and/or as processed user data 138 and/or background data 140 to the sync server 102. Non-limiting examples of such one or more characteristics include bandwidth, latency, resolution, file size, and the like. Such one or more characteristics may be suitably stored as CCD data 320 in a UD data store 310.

User data 312 may be accessed by a UCWP content engine 309 in determining one or more characteristics of reactions received from a CCD 134 and/or another UD. For example, user data 312 may assist in identifying a received user data 138-A as corresponding to the first user "A", while a second received user data 138-B may correspond to the second user "B", while a third received user data 138-C corresponds to the third user "C." Based on the user data 312, a UCWP content engine 309 may be configured to determine which user data 138, such as first user data 138-A or the like to output for display on an internal display 330 and/or an external display 130, how user data 138 is to be displayed, such as in terms of resolution, size, location, or otherwise.

CCD data 320 may also be accessed by a UCWP content engine 309 in establishing a CCD link 136 between a given UD 104 and one or more CCDs 134. For at least one implementation, the establishing of a CCD link 136 may occur using known or later arising device to device pairing protocols, such as those used for pairing BLUETOOTH, Z-WAVE, and other devices. For at least one implementation, a UD CPU 302 may be configured to instantiate multiple device pairing sessions, where a given device pairing session facilitates establishment of a CCD link 136 between a given UD 104 and a given CCD 134. By using multiple sessions, multiple CCDs 134 may be paired with a given UD 104. When multiple CCDs 134 are so paired to a given UD 104, such pairing occurring using e.g., BLUETOOTH and/or other device-to-device pairing technologies, the UCWP content engine 309 may be configured to identify which user data 138 captured by a given, so paired, CCD 134 to process, present, communicate to the sync server 102, store for later processing, or otherwise execute one or more operations with respect thereto, such as outputting such user data 312 for presentation on an internal display 330 and/or on an external display 130. The UCWP content engine 309 may cooperate with the view engine 326 and a multiplexer ("mux") 328 to provide user data 138 and/or background data 140 for presentation, at a given time, on a display device or to output such data using other output devices in a humanly perceptible format such as one or more sounds, motions, temperatures, vibrations, or otherwise.

For at least one implementation, the UCWP content engine 309 may utilize preference data 322 in determining what operations to perform with respect to one or more instances of user data 138 and/or background data 140 received, stored and/or otherwise available for presentation to a user of a given UD 104. For a non-limiting example, a UCWP content engine 309 may be configured to recognize a given background data identifies a user's home and based upon one or more preferences identified in the preference data 322 replace the background data received from a CCD 134 with different background data to be communicated to the sync server 102. Other data processing operations, such as filtering, replacing, obscuring, modifying, or otherwise with respect to user data 138 and/or background data 140 may be performed by a UCWP content engine 309 and in view of one or more preference data 322, CCD data 320, content data 318 or other data available to a given UD 104.

UD Power Supply 332

A UD 104 may include a UD power supply 332. The UD power supply 332 may include any known or later arising technologies which facilitate the use of electrical energy by a UD 104. Non-limiting examples of such technologies include batteries, power converters, inductive charging components, line-power components, solar power components, and otherwise.

UD Security Module 222

A UD 104 may include a UD security 334. The UD security 334 may include any known or later arising security hardware components and/or computer instructions configured for use to secure content, communications regarding such content, UD processes and data, and otherwise. Security components may be used to facilitate secure transmission, processing, storage and otherwise of any data used in accordance the present disclosure.

UD Communications Interface 336

A UD 104 may include one or more UD communications interface 336. A UD communications interface 336 may be configured to use any known or later arising communications and/or networking technologies which facilitate use of the communications network 109 (as described herein).

UD User Interface 324

A UD 104 may include a UD user interface 324. The UD user interface 324 may include any known or later arising human to device interface components, processes, and technologies. Non-limiting examples of input/output uses include audible inputs (such as spoken commands) and outputs (generated sound), visible inputs (such as eye tracking and facial recognition) and outputs (such as visible images presented on a display device, LEDs, or otherwise), touch inputs touch feedback (such as vibrations or other movements), gesture tracking, and otherwise. The UD user interface 324 may be coupled to and/or include the one or more presentation devices such as an internal display 330 and/or an external display 130. The UD user interface 324 may facilitate receiving and processing, in whole or in part, of reactions, as captured by a CCD 134.

A UD user interface 324 may be configured to include one or more view engines 326. A view engine 326 is an "engine" (as described above) which facilitates presentation of content from a given view or perspective. A view engine 326 may facilitate presentation of collaboration information as received by the given UD from the sync server 102. Collaboration information presented by a view engine 326 for a first UD, such as a HUD 104-H, may be the same or different than collaboration information presented by a view engine 326 for a given CUD 104-C.

A UD user interface 324 may include a multiplexer ("mux") 328. A mux 328 may be provided as an "engine" (as described above). A mux 328 may combine collaboration data received from the sync server 102 with content data received from a CCD 134 and with primary content received from a content node 106. A combined presentation may be output by the mux 328 as an integrated presentation of the primary content, UCPC and other collaboration data (when available). During a UCWP, the mux 328 and/or view engine 326 may be configured to facilitate one or more of the operations described above with respect to FIGS. 4-5.

A mux 328 may be configured to modify or adapt an integrated presentation of content based upon one or more characteristic of a given UCWP. For example, a mux 328 may be configured to mute and/or decrease the volume of primary content audio and/or dim a brightness of a primary content video when the UCWP content includes spoken audio by a user of a CUD 104-C. A mux 328 may be configured to receive an input signal from a user input device, such as a keyboard, button, detected gesture, or the like indicative that a user of the given UD desires to provide UCPC or other secondary content to other users during a UCWP. In response to such input, the mux 328 may be configured to mute primary content audio or dim a primary content video while the user provides the secondary content.

Similarly, other properties of a given UCPC, such as video content properties, may be adjusted by the mux 328 when a cell phone is being provided by a user and such UCPC may conflict with or otherwise be given priority and/or precedence over the then arising primary content. For example, primary content video information may be dimmed, diminished in brightness, diminished in sizing, resolution, or otherwise when UCPC is provided. Such video collaboration information may be identified as having a higher priority than the content information by a user of a UD configured to provides such prioritization to the UCPC, such as, but not limited to, a host UD 104-H. For example, a UCWP that includes an unexpected marriage proposal may be configured to provide priority or other emphasis to other content captured by a CCD 134 during the wedding proposal over the otherwise arising primary content.

Internal Display 330

A UD user interface 324 may be coupled to an internal display 330. The internal display 330 may include any singular or combination of visual display devices configured to provide in whole or in part, one or more content segments. Non-limiting examples of internal displays 330 includes display screens or panels, speakers, vibrational elements, lights, and the like. A UD user interface 324 may be configured to provide first content on the internal display 330 while providing second content on an external display 130, or vice-versa.

External Display 130

A UD 104 may be communicatively coupled to an external display 130. Such coupling may occur directly, indirectly such as via use of a 10-Foot device, or otherwise. Multiple external displays 130 may be used in conjunction with a UD 104. For a non-limiting example, first content may be presented on a first external display 130, while second content is presented on a second external display 130. A UD sync engine 304 may present first content segments received from a content node 106 such that the other content segments received from a CCD 134 may be synchronized therewith.

For at least one implementation, content may be presented in a first content window 142, while second content, such as user image data 146 and/or background image data 148 is presented in a second content window 144. Multiple forms of content may be presented as an overlay, in separate windows, multi-picture, picture-in-picture, or otherwise.

A UD user interface 324 may be configured to receive and/or output content segments that include one or more types of data including audio content, visual content, and others. Such inputs and outputs may occur using known and/or later arising interfaces therewith, herein "I/O interfaces." Various non-limiting features and functions of such I/O interface are described herein.

Audio I/O Interface

An audio I/O interface may support a receiving and/or presenting of audible content to a user via a UD 104. Such audible content (which is also referred to herein as being "audible signals") may include spoken text, sounds, or any other audible information. Such audible signals may include one or more of humanly perceptible audio signals, where humanly perceptible audio signals typically arise between 20 Hz and 20 KHz. The range of humanly perceptible audio signals may be configurable to support an audible range of a given individual user.

An audio I/O interface generally includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise.

An audio I/O interface may use one or more microphones and speakers to capture and present audible signals respectively from and to a user. Such one or more microphones and speakers may be provided by a given UD 104 itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD.

An audio I/O interface may be configured to automatically recognize and capture comments spoken by a user and intended as audible signals for sharing with other users during a UCWP. Such identification may occur as a default setting of the audio I/O interface into a "capture" mode, based upon analysis and recognition of spoken comments as being intended for one or more second users attending a UCWP.

For example, a comment such as, "Go CHIEFS," where "CHIEFS" refers to an NFL football team participating in a game being presented during a UCWP, may be automatically captured, and shared as one or more audible signals by an audio I/O interface with other users during the UCWP. The analysis and determination of which captured sounds to share with select users during a UCWP may be accomplished by execution of corresponding computer instructions by one or more of the engines described herein including, but not limited to, the UD conference engine 306, and other components such as the UD user interface 324, and/or in conjunction with computer instructions executed by a sync server 102 and engines instantiated thereby.

Visual I/O Interface:

A UD 104 may include a visual I/O interface configured to support the receiving and presenting of visual content (which is also referred to herein as being "visible signals") between UDs during a UCWP. Such visible signals may be in any form, such as still images, motion images, augmented reality images, virtual reality images, and otherwise.

A visual I/O interface generally includes hardware and computer instructions (herein, "visible technologies") which supports the input by and output of visible signals to other UDs during a UCWP. Such visible technologies may include technologies for converting images (in any spectrum range) into humanly perceptible images, converting content of visible images into a given user's perceptible content, such as by character recognition, translation, playback rate adjustment, playback frequency adjustment, and otherwise.

A visual I/O interface may be configured to use one or more display devices, such as the internal display 330 and/or external display 130, that are configured to present visible signals to a user. A visual I/O interface may be configured to use one or more CCDs 134 and/or other image capture devices to capture content, including reactions. Non-limiting examples include lenses, digital image capture and processing software and the like. Accordingly, it is to be appreciated that any existing or future arising visual I/O interfaces, devices, systems and/or components may be utilized by and/or in conjunction with a UD to facilitate the capture, communication and/or presentation of visual content (i.e., visible signals) during a UCWP.

In at least one implementation of the present disclosure, during a UCWP users may provide their comments and/or reactions visibly for presentation to other users and receive representations of other user's comments and/or reactions visibly using one or more visible signals provided with a content segment.

Although various implementations have been described above with a certain degree of particularity, or with reference to one or more individual implementations, those skilled in the art could make numerous alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings shall be interpreted as illustrative of implementations and not limiting. Changes in detail or structure may be made without departing from the basic elements of the present disclosure as described in the following claims.

What is claimed is:

1. A server comprising:
a processor;
a data store coupled to the processor, storing non-transient server computer instructions; and
wherein the server is communicatively coupled with at least one content provider and with a set of at least two user devices;
wherein the non-transient server computer instructions, when executed by the processor, instruct the server to perform operations comprising:
  initiating a user choice watch party (UCWP);
  receiving a request to designate a first user device, from the set of at least two user devices, as a primary user choice user device (PUCUD) for the UCWP;
  first designating the first user device as the PUCUD;
  first querying the set of at least two user devices for one or more second user devices to participate in the UCWP as one or more secondary user choice user devices (SUCUD);
  when a result of the querying is positive, second designating positively responding user device, from the set of at least two user devices, as SUCUDs;
  repeating the first querying and second designating operations for each user device in the set of at least two user devices;
  ending the UCWP when a result of the querying is a negative for the set of at least two user devices;
  generating a user choice interface (UCI);
  retrieving two or more user choice primary content (UCPC) options;
  instructing the PUCUD and the one or more SUCUDs to output for presentation to respective users the two or more UCPC options;
  receiving at least two user choices;
  determining, based on the at least two user choices and from the two more UCPC options, a selection result indicating a chosen UCPC option to present during the UCWP; and
  presenting the chosen UCPC to the set of at least two user devices during the UCWP.

2. The server of claim 1,
wherein the operation of retrieving two or more UCPC options further comprises:
  retrieving the two or more UCPC options from at least one of a data store and a content provider.

3. The server of claim 2,
wherein at least one of the two or more UCPC segments comprises a movie poster.

4. The server of claim 3,
wherein the at least one of the two or more UCPC segments further comprises a movie trailer.

5. The server of claim 2,
wherein the operation of retrieving two or more UCPC options further comprises:
  filtering the two or more UCPC options based on at least one digital rights management (DRM) rights associated with a given UCPC identified by the two or more UCPC options and DRM rights associated with the PUCUD and the SUCUDs.

6. The server of claim 1,
wherein the at least two user choices include a primary choice from the PUCUD and a secondary choice from one of the one or more SUCUDs.

7. The server of claim 1,
wherein the operations of receiving the at least two user choices further comprises:
  receiving user reactions to the two or more UCPC options;
    wherein the user reactions are respectively captured by content capture devices (CCDs) respectively coupled to the PUCUD and the one or more SUCUDs; and
  ranking the two or more UCPC options based on the user reactions.

8. The server of claim 7,
wherein the operations of receiving the at least two user choices further comprises:
  presenting the user reactions in the UCI; and
wherein the CCDs respectively capture, in a video format, the user reactions, for the user of the PUCUD or the one or more SUCUDs, to the two or more UCPC options.

9. The server of claim 1, wherein the operations further comprise:
  monitoring, during the presenting the chosen UCPC to the set of at least two user devices, for user reactions;
  classifying the user reactions; and
  generating, based on the user reactions, an engagement score for the chosen UCPC option.

10. The server of claim 9,
wherein the engagement score is generated based upon a given user's reaction to at least one aspect of the chosen UCPC option; and
wherein the at least one aspect includes dialog, drama, action, plot, character development, drama, and scariness.

11. A method comprising:
receiving a request to designate a first user device, from a set of at least two user devices, as a primary user choice user device (PUCUD) for a user choice watch party (UCWP);
first designating the first user device as the PUCUD;
first querying the set of at least two user devices for one or more second user devices to participate in the UCWP as one or more secondary user choice user devices (SUCUD);
when a result of the querying is positive, second designating positively responding user device, from the set of at least two user devices, as SUCUDs;
repeating the first querying and second designating operations for each user device in the set of at least two user devices;
ending the UCWP when a result of the querying is a negative for the set of at least two user devices;
generating a user choice interface (UCI) for presentation to respective users of of the PUCUD and the one or more SUCUDs;
retrieving two or more user choice primary content (UCPC) options;
instructing the PUCUD and the one or more SUCUDs to output for presentation to respective users the two or more UCPC options;
receiving at least two user choices;
determining, based on the at least two user choices and from the two more UCPC options, a selection result indicating a chosen UCPC option to present during the UCWP; and
presenting the chosen UCPC to the set of at least two user devices during the UCWP.

12. The method of claim 11, further comprising:
retrieving the two or more UCPC options from at least one of a data store and a content provider.

13. The method of claim 12,
wherein the two or more UCPC segments comprises a portion of a soundtrack.

14. The method of claim 13, further comprising:
filtering the two or more UCPC options based on at least one digital rights management (DRM) rights associated with a given UCPC identified by the two or more UCPC options and DRM rights associated with the PUCUD and the SUCUDs.

15. The method of claim 14, further comprising:
receiving user reactions for the two or more UCPC options;
wherein the user reactions are respectively captured by content capture devices (CCDs) respectively coupled to the PUCUD and the one or more SUCUDs; and
ranking the two or more UCPC options based on the user reactions.

16. The method of claim 15, further comprising:
presenting the user reactions in the UCI; and
wherein at least one of the CCDs is configured to respectively capture, in a video format, the user reactions, for the user of the PUCUD or the one or more SUCUDs, to the two or more UCPC options.

17. The method of claim 16, further comprising:
monitoring, during the presenting the chosen UCPC to the set of at least two user devices, for user reactions;
classifying the user reactions; and
generating, based on the user reactions, an engagement score for the chosen UCPC option.

18. The method of claim 17,
wherein the engagement score is generated based upon a given user's reaction to at least one aspect of the chosen UCPC option.

19. A non-transitory computer readable medium, having stored thereon computer instructions which, when executed by a processor of a server, cause the server to perform operations comprising:
initiating a user choice watch party (UCWP);
receiving a request to designate a first user device, from a set of at least two user devices, as a primary user choice user device (PUCUD) for the UCWP;
first designated the first user device as the PUCUD;
first querying the set of at least two user devices for one or more second user devices to participate in the UCWP as one or more secondary user choice user devices (SUCUDs);
when a result of the querying is positive, second designating positively responding user device, from the set of at least two user devices, as SUCUDs;
repeating the first querying and second designating operations for each user device in the set of at least two user devices;
ending the UCWP when a result of the querying is a negative for the set of at least two user devices;
generating a user choice interface (UCI) for presentation to respective users of the PUCUD and the SUCUDs;
retrieving two or more user choice primary content (UCPC) options;
instructing the PUCUD and the one or more SUCUDs to output, for presentation to respective users, the two or more UCPC options;
receiving at least two user choices;
determining, based on the at least two user choices and from the two more UCPC options, a selection result indicating a chosen UCPC to present during a user choice watch party (UCWP); and
presenting, during the UCWP, the chosen UCPC to the PUCUD and the one or more SUCUDs.

20. The non-transitory computer readable medium of claim 19, wherein the operations further comprise:
receiving user reactions for the two or more UCPC options;
wherein the user reactions are respectively captured by content capture devices (CCDs) respectively coupled to the PUCUD and the one or more SUCUDs; and
ranking the two or more UCPC options based on the user reactions.

* * * * *